US009513896B2

(12) United States Patent
Nakamura

(10) Patent No.: US 9,513,896 B2
(45) Date of Patent: Dec. 6, 2016

(54) SERVER, INFORMATION PROCESSING SYSTEM, AND COMPUTER PRODUCT

(71) Applicant: Shigeru Nakamura, Kanagawa (JP)

(72) Inventor: Shigeru Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 10 days.

(21) Appl. No.: 14/204,043

(22) Filed: Mar. 11, 2014

(65) Prior Publication Data

US 2014/0282485 A1 Sep. 18, 2014

(30) Foreign Application Priority Data

Mar. 15, 2013 (JP) ................................. 2013-054377

(51) Int. Cl.
G06F 9/44 (2006.01)
G06F 9/445 (2006.01)
(52) U.S. Cl.
CPC ...................... G06F 8/65 (2013.01)
(58) Field of Classification Search
CPC ........................................................ G06F 8/65
USPC ........................................................ 717/173
See application file for complete search history.

(56) References Cited

U.S. PATENT DOCUMENTS

| | | | |
|---|---|---|---|
| 8,171,465 B2* | 5/2012 | Kodaka et al. ............... | 717/168 |
| 2003/0101445 A1* | 5/2003 | Li et al. ........................ | 717/170 |
| 2004/0181790 A1* | 9/2004 | Herrick ..................... | G06F 8/60 |
| | | | 717/168 |
| 2005/0132350 A1* | 6/2005 | Markley .................... | G06F 8/65 |
| | | | 717/168 |
| 2010/0306356 A1* | 12/2010 | Gao et al. ...................... | 709/222 |
| 2012/0060152 A1* | 3/2012 | Oh et al. ........................ | 717/170 |
| 2012/0072895 A1 | 3/2012 | Koyama et al. | |
| 2013/0159991 A1* | 6/2013 | Sato .................... | G06F 9/44505 |
| | | | 717/173 |

FOREIGN PATENT DOCUMENTS

| | | |
|---|---|---|
| JP | 2011-193264 | 9/2011 |
| JP | 2012-84118 | 4/2012 |

* cited by examiner

*Primary Examiner* — Wei Zhen
*Assistant Examiner* — Lanny Ung
(74) *Attorney, Agent, or Firm* — Oblon, McClelland, Maier & Neustadt, L.L.P.

(57) ABSTRACT

A server includes a receiver configured to receive, from an information processing apparatus that executes update, an instruction for transmitting metadata of update data used for the update; a determining unit configured to determine whether the update data includes preliminary download data, wherein the preliminary download data has an update date and time later than a current date and time, and the update date and time is a date and time from which the update becomes available; a transmitter configured to transmit, when the determining unit determines that the update data includes preliminary download data, metadata of the preliminary download data to the information processing apparatus via a communication network; and a prohibiting unit configured to prohibit transfer of the metadata of the preliminary download data on the basis of the number of information processing apparatuses that are downloading the preliminary download data.

7 Claims, 17 Drawing Sheets

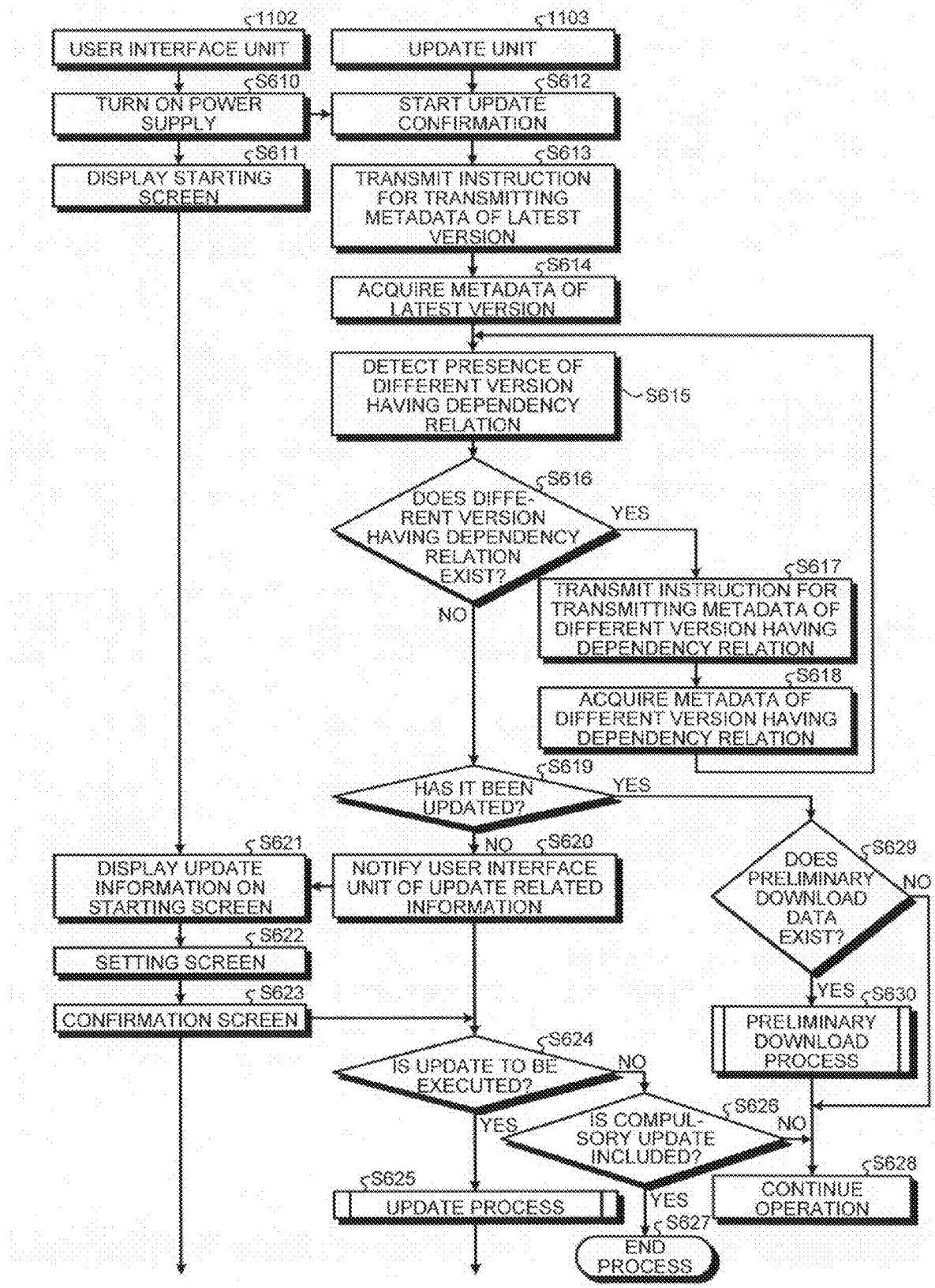

FIG.7

```
{
"version": "1.0.1",
"dependency": "1.0.0",
"description": "It is sample data.",
"files": [
 {"src": "https://update.example.jp/1.0.1/NewFile.dll", "sha1sum":
"3ab15e931dcd60e5acfeac271bd09d57641611b6"},
 {"src": "https://update.example.jp/1.0.1/NewFirm.exe", "sha1sum":
"d296c72aaca0a168e319f5898fda3ee0e3e7d4c8"},
 {"src": "https://update.example.jp/1.0.1/update.dup", "sha1sum":
"e709041747e02c181df37d8ddc0a6296b712aaf1"}
],
"scriptname": "update.dup",
"require_reboot": "true",
"force_update": "true"
"valid date": "201209151200"
"data size": "1954262"
}
```

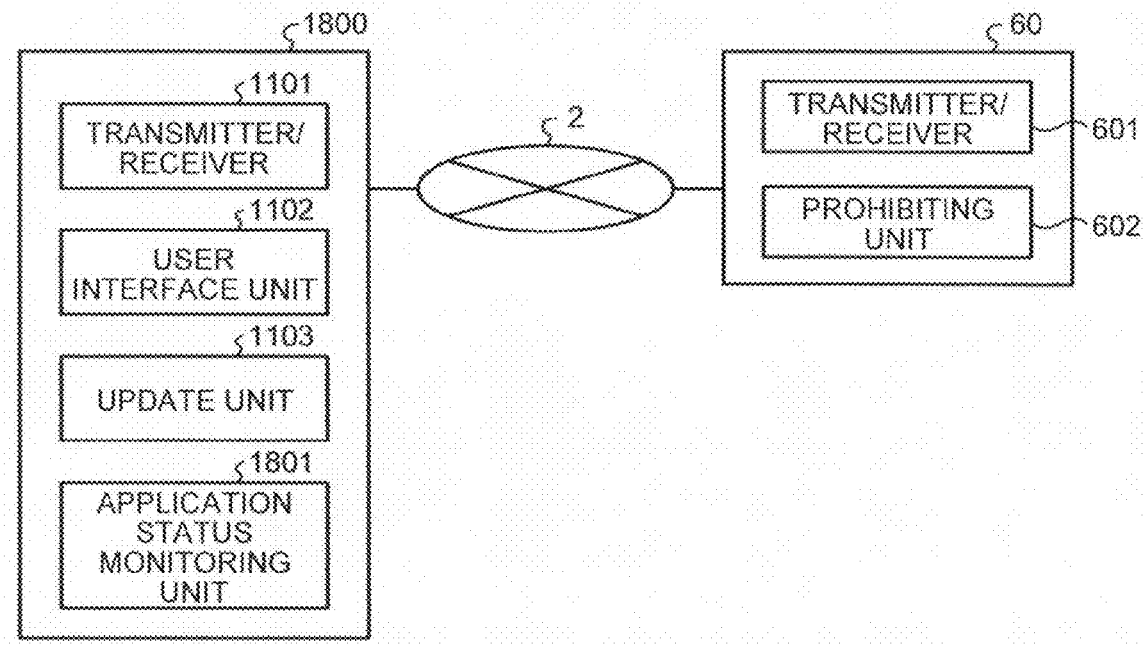
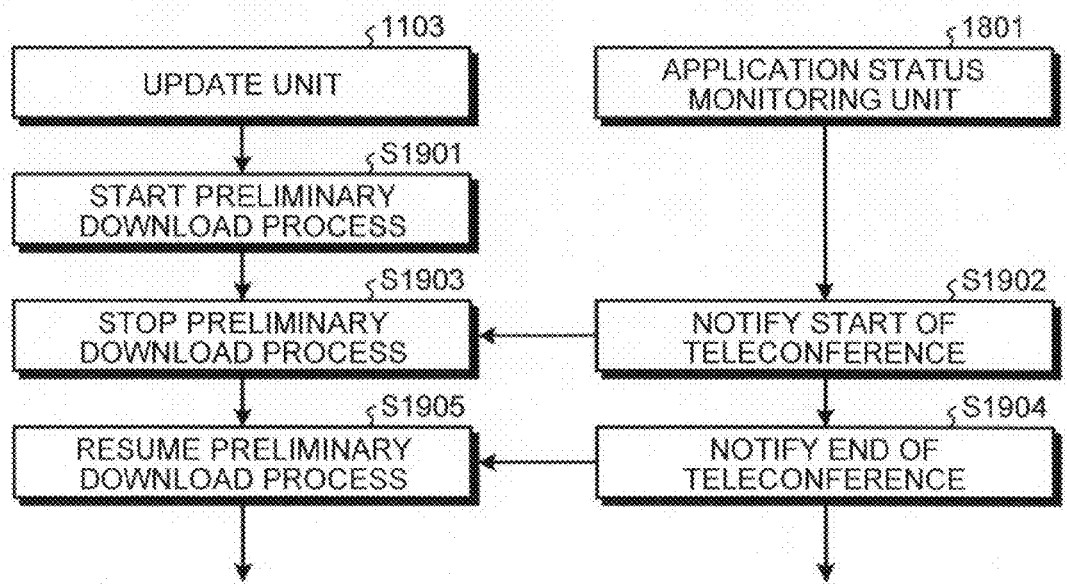

SERVER, INFORMATION PROCESSING SYSTEM, AND COMPUTER PRODUCT

CROSS-REFERENCE TO RELATED APPLICATIONS

The present application claims priority to and incorporates by reference the entire contents of Japanese Patent Application No. 2013-054377 filed in Japan on Mar. 15, 2013.

BACKGROUND OF THE INVENTION

1. Field of the Invention

The present invention relates to a server, an information processing system, and a computer program product.

2. Description of the Related Art

Teleconference systems are widely used to hold a meeting between different sites (remote places) by exchanging images and voices between communication apparatuses installed at the different sites over a communication network, such as the Internet. Specifically, in such a teleconference system, by using a communication apparatus (an example of an information processing apparatus) installed at a site where participants are taking part in a meeting, captured images of the meeting room including the participants and their voices, such as comments made by the participants, are collected. The images and voices are converted into digital data and the digital data is transmitted to another communication apparatus installed at a different (remote) site. The communication apparatus installed at the remote site displays the received images on a display device and outputs the received voices through a speaker. This enables the teleconference system to facilitate a meeting between the remote sites in almost the same manner as if a meeting was held at one site.

In the teleconference system, firmware (a computer program) stored in each communication apparatus installed at the different sites is regularly updated to improve security of information (e.g., images and voices) exchanged between the communication apparatuses installed at the different sites and to improve operability of the teleconference system. A method of updating firmware stored in the communication apparatus includes the following: downloading the update data used for updating the firmware and the metadata of the update data from a server connected to the communication apparatus through a network; determining whether the firmware needs to be updated on the basis of the downloaded metadata; and updating the firmware by using the downloaded update data if it is determined that the firmware needs to be updated (see Japanese Patent Application Laid-open No. 2012-84118).

The update data is usually allowed to be downloaded on or after a predetermined update date and time, from which an update becomes available. A technology has been disclosed for preventing access concentration to the server due to downloading the update data by distributing the time to download the update data. With this technology, the update data is downloaded before the update date and time and then the firmware is updated on or after the update date and time using the downloaded update data (see Japanese Patent Application Laid-open No. 2011-193264).

With this technology, however, the server from which the update data is downloaded may be simultaneously accessed before the predetermined update date and time. In such a case, the time when the network and the server are loaded due to the downloading is just moved before the predetermined update date and time, but the time when the network and the server are loaded is not distributed. This may bring down the server or increase the time taken to download the update data, thus, degrading the user's convenience.

There is a need for a server and an information processing system that are capable of achieving efficient update of data by preventing accesses from concentrating on a server or a network.

SUMMARY OF THE INVENTION

According to an aspect of the present invention, a server is provided that includes: a receiver configured to receive, from an information processing apparatus that executes update, an instruction for transmitting metadata of update data used for the update; a determining unit configured to determine whether the update data includes preliminary download data, wherein the preliminary download data has an update date and time later than a current date and time, and the update date and time is a date and time from which the update becomes available; a transmitter configured to transmit, when the determining unit determines that the update data includes preliminary download data, metadata of the preliminary download data to the information processing apparatus via a communication network; and a prohibiting unit configured to prohibit transfer of the metadata of the preliminary download data on the basis of the number of information processing apparatuses that are downloading the preliminary download data.

According to another aspect of the present invention, an information processing system is provided that includes an information processing apparatus configured to execute update and a server that is connected to the information processing apparatus via a network. The server includes a receiver configured to receive, from the information processing apparatus, an instruction for transmitting metadata of update data used for the update; a determining unit configured to determine whether the update data includes preliminary download data, wherein the preliminary download data has an update date and time later than a current date and time, and the update date and time is a date and time from which the update becomes available; a transmitter configured to transmit, when the determining unit determines that the update data includes preliminary download data, metadata of the preliminary download data to the information processing apparatus via a communication network; and a prohibiting unit configured to prohibit transfer of the metadata of the preliminary download data on the basis of a number of information processing apparatuses that are downloading the preliminary download data.

According to still another aspect of the present invention, an information processing system is provided that includes a computer configured to execute a computer program that causes the computer to function as: a receiver configured to receive, from an information processing apparatus that executes update, an instruction for transmitting metadata of update data used for the update; a determining unit configured to determine whether the update data includes preliminary download data, wherein the preliminary download data has an update date and time later than a current date and time, and the update date and time is a date and time from which the update becomes available; a transmitter configured to transmit, when the determining unit determines that the update data includes preliminary download data, metadata of the preliminary download data to the information processing apparatus via a communication network; and a prohibiting unit configured to prohibit transfer of the metadata of the preliminary download data on the basis of a number of information processing apparatuses that are downloading the preliminary download data. The information processing system further includes the information processing apparatus configured to download the preliminary download data on the basis of the metadata transmitted from the transmitter.

According to still another aspect of the present invention, a computer program product is provided that includes a non-transitory computer-readable medium that contains a computer program that causes a computer to perform: receiving, from an information processing apparatus that executes update, an instruction for transmitting metadata of update data used for the update; determining whether the update data includes preliminary download data, wherein the preliminary download data has an update date and time later than a current date and time, and the update date and time is a date and time from which the update becomes available; transmitting, when the determining unit determines that the update data includes preliminary download data, metadata of the preliminary download data to the information processing apparatus via a communication network; and prohibiting transfer of the metadata of the preliminary download data on the basis of a number of information processing apparatuses that are downloading the preliminary download data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a flowchart illustrating an operation flow for updating in the update server according to the first embodiment;

FIG. 7 is a diagram illustrating an example of the metadata transmitted from the update server according to the first embodiment;

FIG. 18 is a block diagram illustrating the functional configuration of an information processing apparatus and an update server according to a second embodiment; and FIG. 19 is a flowchart illustrating a process flow for stopping a preliminary download process in the information processing apparatus according to the second embodiment.

DETAILED DESCRIPTION OF THE PREFERRED EMBODIMENTS

Exemplary embodiments of a server, an information processing system, and a computer program product of the present invention are described in detail below with reference to the accompanying drawings.

First Embodiment

Figure 1:
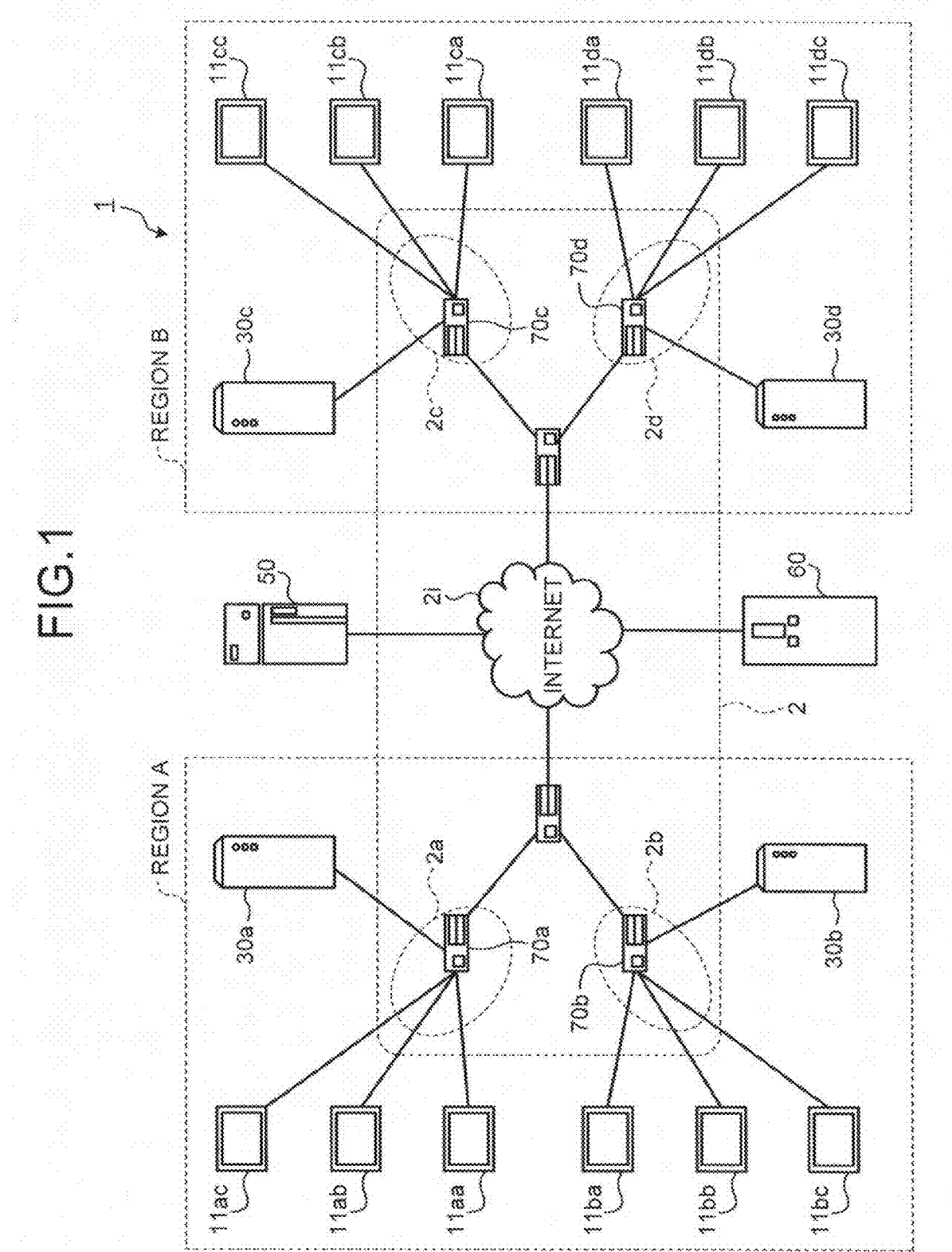
FIG. 1 is a schematic diagram illustrating an example of the configuration of a remote communication system according to a first embodiment of the present invention.

FIG. 1 is a schematic diagram illustrating an example of the configuration of a remote communication system 1 according to a first embodiment. As illustrated in FIG. 1, the remote communication system 1 (an example of an information processing system) includes information processing apparatuses 11aa to 11ac, 11ba to 11bc, 11ca to 11cc, and 11da to 11dc, a remote communication management server 50, an update server 60, and routers 70a to 70d connected to each other by a communication network 2 to communicate with each other. Specifically, the remote communication system 1 includes local area networks (LANs) 2a, 2b, 2c, and 2d connected to the Internet 2i through the routers 70a to 70d, the remote communication management server 50, and the update server 60, the information processing apparatuses 11aa to 11ac and a relay device 30a that are connected to the LAN 2a, the information processing apparatuses 11ba to 11bc and a relay device 30b that are connected to the LAN 2b, the information processing apparatuses 11ca to 11cc and a relay device 30c that are connected to the LAN 2c, and the information processing apparatuses 11da to 11dc and a relay device 30d that are connected to the LAN 2d.

In the remote communication system 1, under the management of the remote communication management server 50, the information processing apparatuses 11aa to 11ac and 11ba to 11bc in a region A and the information processing apparatuses 11ca to 11cc and 11da to 11dc in a region B can exchange voices and images with each other through the relay devices 30a, 30b, 30c, and 30d, thereby calling each other.

Specifically, the remote communication management server 50 stores therein communication addresses of the information processing apparatuses 11aa to 11ac, 11ba to 11bc, 11ca to 11cc, and 11da to 11dc and the relay devices 30a, 30b, 30c, and 30d; information processing apparatuses for which each of the relay devices 30a, 30b, 30c, and 30d performs relaying; and call statuses of each information processing apparatus.

For example, if the information processing apparatus 11aa calls the information processing apparatus 11ca, the information processing apparatus 11aa instructs the relay device 30a to relay communication data to the information processing apparatus 11ca. The relay device 30a notifies the remote communication management server 50 that a call of the information processing apparatus 11aa starts, and acquires, from the remote communication management server 50, the communication address of the relay device 30c to relay the communication data to the information processing apparatus 11ca. The relay device 30a then instructs the relay device 30c to relay communication data to the information processing apparatus 11ca and the relay device 30c starts a communication with the information processing apparatus 11ca. The relay device 30c notifies the remote communication management server 50 of the start of the communication with the information processing apparatus 11ca.

In this way, a call between the information processing apparatus 11aa and the information processing apparatus 11ca is started through the relay devices 30a and 30c. The remote communication management server 50 stores therein a fact that a call is being made between the information processing apparatus 11aa and the information processing apparatus 11ca. For example, if the information processing apparatus 11ab inquires of the remote communication management server 50 about a call status of the information processing apparatus 11aa or the information processing apparatus 11ca, the remote communication management server 50 returns that the information processing apparatus 11aa and the information processing apparatus 11ca are on-line and they are making a call with each other.

Hereinafter, regarding two or more devices that are the same type and have a reference numeral composed of a first part of numeric characters and a second part of letters, an arbitrary one of such devices is referred to the numerical characters only. For example, the information processing apparatuses 11aa to 11ac, 11ba to 11bc, 11ca to 11cc, and 11da to 11dc are referred to as an information processing apparatus 11. The relay devices 30a to 30d are referred to as a relay device 30.

The update server 60 stores therein information related to an update of the computer program or various setting information of the information processing apparatus 11 and transmits the update related information according to a transmission instruction made by the information processing apparatus 11. The update related information includes update data and metadata of the update data. The update data is used to execute updating and it includes all the versions of the computer program and various setting information of the information processing apparatus 11 including old versions and the latest version. The metadata includes details about update to each version of the computer program and information on various settings. Because the update server 60 stores therein the data files of all the versions as the update related information, it is possible to execute updating at an arbitrary time for each information processing apparatus 11.

If, for example, the information processing apparatus 11 executes updating frequently, an update directly to the latest version would be executed. In contrast, if the information processing apparatus 11 does not execute updating for a long time, it may be necessary to upgrade versions before executing an update to the latest version. In such a case, before executing an update to the latest version, an update to an old version (that has a dependency relation with the latest version) may be executed. To cope with such cases, the update server 60 stores therein data files of all the versions (or the required versions only) as the update related information.

Note that there are two kinds of updates: a normal update and a compulsory update. The normal update is executed for the purpose of correcting defects, such as bugs, or adding functions.

The compulsory update is compulsorily executed in association with a change in a device that is different from the information processing apparatus 11 or a change in a function that is different from that of the information processing apparatus 11. For example, a compulsory update is executed when the relay device 30 changes a data format or a video codec of communication data that is transmitted and received during a call, or when the version of the relay device 30 is upgraded. A compulsory update may be executed when a communication protocol used by the relay device 30 is changed. Such a change in the relay device 30 may change the structure of the communication data. A change of the communication protocol used by the relay device 30 may change the communication procedure with the relay device 30 or the function of the relay device 30. With these changes, the information processing apparatus 11 cannot make calls, the making of which is a major function of the information processing apparatus 11, unless it is updated. Therefore, in such a case, a compulsory update is executed so that the information processing apparatus 11 becomes compatible with the version of the updated relay device 30.

When, for example, a security problem, such as a security hole, is found on the side of the relay device 30, the relay device 30 would be updated to cope with the security hole. If the relay device 30 is updated, the information processing apparatus 11 cannot make even calls unless it is updated. Therefore, a compulsory update is executed so that the information processing apparatus 11 becomes compatible with the relay device 30 that is updated to cope with the security hole.

Figure 2:
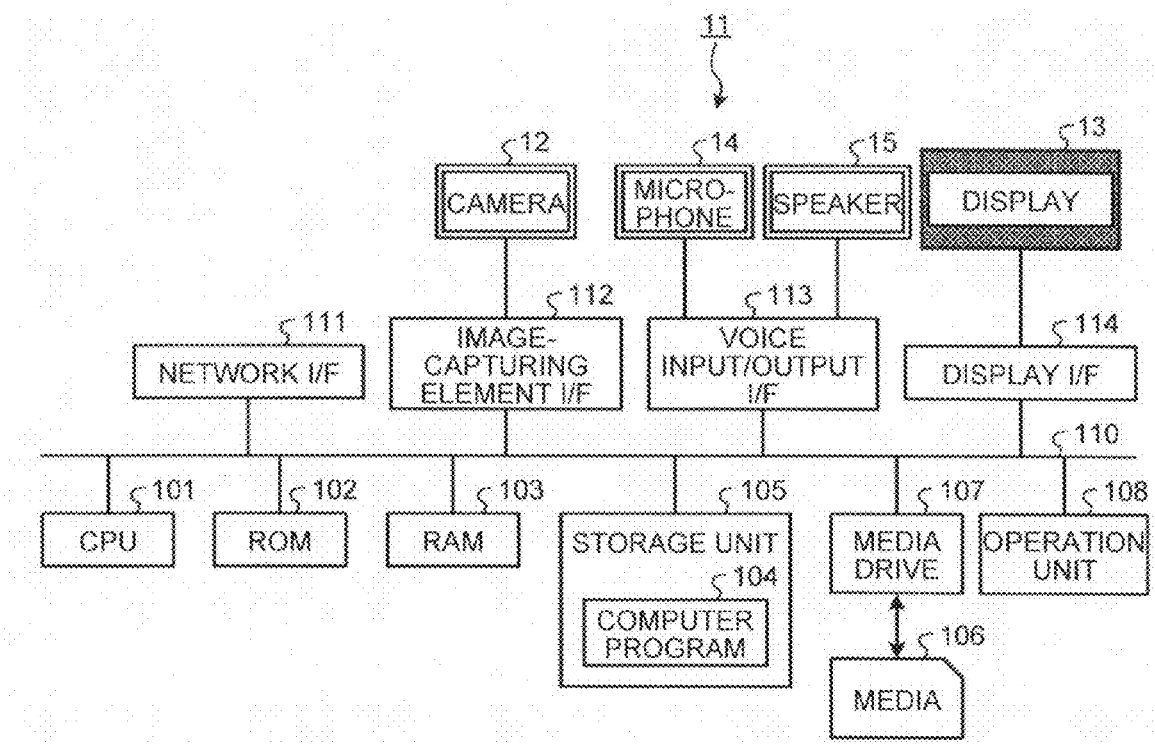
FIG. 2 is a block diagram illustrating the hardware configuration of an information processing apparatus according to the first embodiment.

The following describes the hardware configuration of the information processing apparatus 11 according to the present embodiment. FIG. 2 is a block diagram illustrating the hardware configuration of the information processing apparatus according to the first embodiment. As illustrated in FIG. 2, the information processing apparatus 11 includes a central processing unit (CPU) 101, a read only memory (ROM) 102, a random access memory (RAM) 103, a storage unit 105, a media drive 107, an operation unit 108, a network interface (I/F) 111, an image-capturing element I/F 112, a voice input/output I/F 113, and a display I/F 114; and these units and parts are connected to each other by a bus 110.

The CPU 101 controls operations of the information processing apparatus 11 by loading a computer program (not illustrated) stored in the ROM 102 or a computer program 104 stored in the storage unit 105 to the RAM 103 and sequentially executing the computer programs. The storage unit 105 is a hard disk drive (HDD) or a solid state drive (SSD) and stores therein the computer program 104 to be executed by the CPU 101 or the various setting information. In the updating, the computer program 104 or the various setting information that is stored in the storage unit 105 is updated by the CPU 101.

The media drive 107 is a device that performs a read and/or a write operation on media 106 such as an optical disc. The operation unit 108 is a keyboard, various operation keys, and a touch panel laminated on a display 13 and receives an operation input by a user. The network I/F 111 is an interface that is connected to the communication network 2 and performs data communication. The image-capturing element I/F 112 is an interface connected to a camera 12 that is a digital camera and acquires an image captured by the camera 12. The voice input/output I/F 113 is an interface connected to a microphone 14 and a speaker 15 and performs a voice input by the microphone 14 or a voice output by the speaker 15. The display I/F 114 is an interface connected to the display 13 serving as a display unit such as a liquid crystal display (LCD) and outputs display data to the display 13.

The display 13 is used in the present embodiment; however, it is allowable to use, instead of the display 13, another display apparatus such as a projector.

The information processing apparatus 11 outputs, under control of the CPU 101 executing the computer program 104, an image acquired through the camera 12 or a voice received from the microphone 14 to the relay device 30 through the network I/F 111 during a call with another information processing apparatus, for example. The information processing apparatus 11 outputs, by the speaker 15, a voice that has been transmitted from another information processing apparatus, relayed by the relay device 30 and received through the network I/F 111, and displays an image from another information processing apparatus on the display 13. As a result, the information processing apparatus 11 achieves a call with another information processing apparatus through images and voices, that is, achieves a teleconference.

Figure 3:
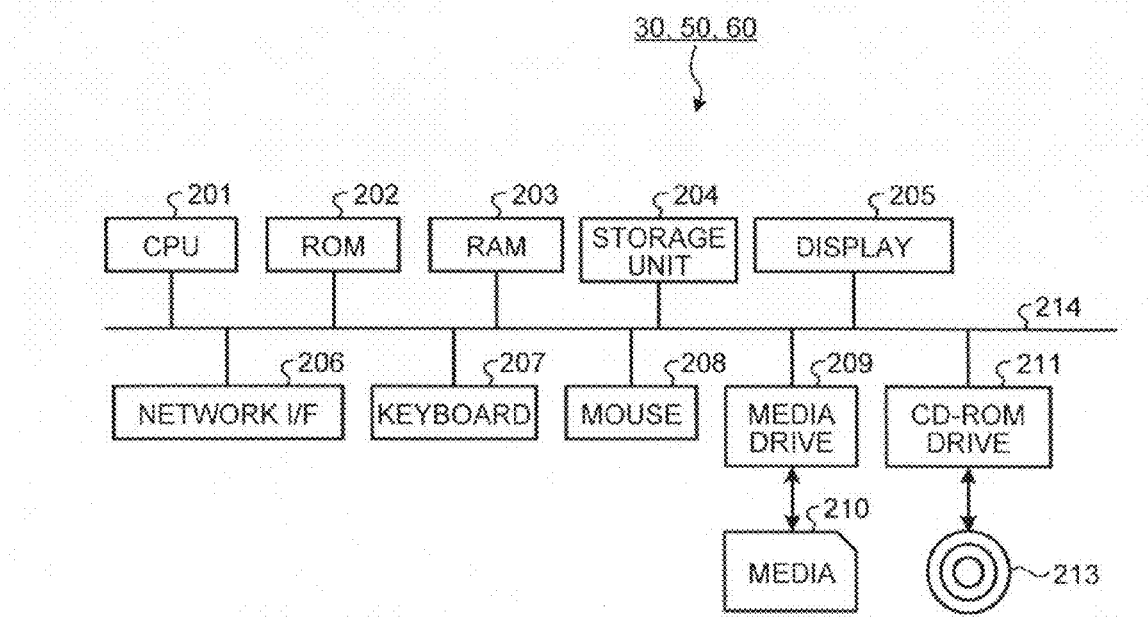
FIG. 3 is a block diagram illustrating the hardware configuration of a relay device, a remote communication management server, and an update server according to the first embodiment.

The following describes the hardware configuration of the relay device 30, the remote communication management server 50, and the update server 60. FIG. 3 is a block diagram illustrating the hardware configuration of the relay device, the remote communication management server, and the update server according to the first embodiment. As illustrated in FIG. 3, each of the relay device 30, the remote communication management server 50, and the update server 60 includes a CPU 201, a ROM 202, a RAM 203, a storage unit 204, a display 205, a network I/F 206, a keyboard 207, a mouse 208, a media drive 209, and a compact disk read-only memory (CD-ROM) drive 211, and all of the units and parts are connected to each other by a bus 214. Each of the relay device 30, the remote communication management server 50, and the update server 60 is an apparatus, such as a personal computer (PC) or a workstation (WS).

The CPU 201 loads a computer program stored in the ROM 202 or the storage unit 204 to the RAM 203, and sequentially executes the computer programs, thereby controlling an operation of the information processing apparatus. The storage unit 204 is an HDD or an SSD and stores therein information related to an update, for example.

The display 205 is a display unit such as an LCD, for example. The network I/F 206 is an interface connected to the communication network 2 and performs data communication. The keyboard 207 and the mouse 208 receive an operation input by the user. The media drive 209 is a device to perform a read and/or write operation on media 210 such as an optical disc. The CD-ROM drive 211 is a device that performs a read operation on a CD-ROM 213. For example, in the update server 60, the latest information related to an update is provided by the media 210 or the CD-ROM 213 and is stored in the storage unit 204.

Figure 4:
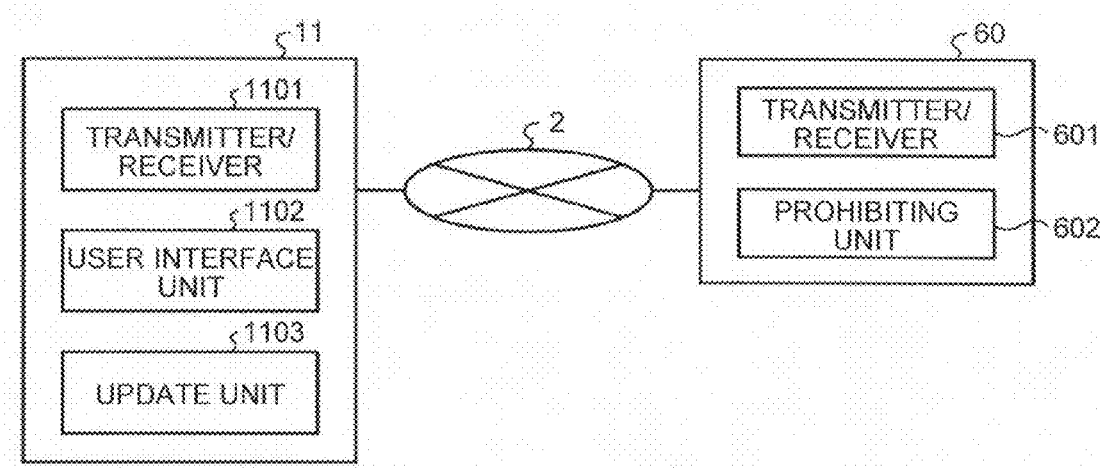
FIG. 4 is a block diagram illustrating the functional configuration of the information processing apparatus and the update server according to the first embodiment.

The following describes the functional configuration of the information processing apparatus 11 and the update server 60 achieved by executing a computer program by the CPU 101 included in the information processing apparatus 11 or the CPU 201 included in the update server 60. FIG. 4 is a block diagram illustrating the functional configuration of the information processing apparatus and the update server according to the first embodiment. As illustrated in FIG. 4, the information processing apparatus 11 includes a transmitter/receiver 1101, a user interface unit 1102, and an update unit 1103. The update server 60 includes a transmitter/receiver 601 and a prohibiting unit 602.

The following firstly describes the functional configuration of the information processing apparatus 11. The transmitter/receiver 1101 exchanges data with the update server 60 through the communication network 2. Specifically, the transmitter/receiver 1101 starts a communication using a predetermined communication protocol, on the basis of the communication address of the update server 60 preset in the setting information of the storage unit 105 or the communication address of the update server 60 acquired from the remote communication management server 50, thereby exchanging data with the update server 60. By exchanging the data with the update server 60, the transmitter/receiver 1101 acquires update related information that is stored in the update server 60.

The user interface unit 1102 is an interface that controls voices output by the speaker 15, displays of various types of information on the display 13, and an operation received from the user through the operation unit 108, and controls information transfer between the user and the information processing apparatus 11. Specifically, the user interface unit 1102 notifies the user of various types of information through the voices output by the speaker 15 and the displays of various types of information on the display 13 and receives an operation from the user through the operation unit 108.

The update unit 1103 updates the computer program 104 or various setting information stored in the storage unit 105, on the basis of the update related information acquired from the update server 60 by the transmitter/receiver 1101.

The following describes the functional configuration of the update server 60. The transmitter/receiver 601 exchanges data with the information processing apparatus 11 through the communication network 2. Specifically, the transmitter/receiver 601 starts a communication session using a predetermined communication protocol in response to a request from the information processing apparatus 11 through the communication network 2, thereby exchanging the data with the information processing apparatus 11.

The transmitter/receiver 601 transmits the update data, which is included in the update related information stored in the update server 60, to the information processing apparatus 11. In addition, the transmitter/receiver 601 functions as a determining unit that determines whether preliminary download data exists in the update data, which is included in the update related information stored in the update server 60. The preliminary download data is update data having a predetermined update date and time later than the current date and time. The update date and time is a date and time from which an update becomes available. The transmitter/receiver 601 functions as a transmitter that transmits, when it is determined that the preliminary download data exists, metadata corresponding to the preliminary download data to the information processing apparatus 11 via the communication network 2. The metadata corresponding to the preliminary download data is used to determine whether it is necessary to execute an update using the preliminary download data. In the present embodiment, the metadata includes "version" as illustrated in FIG. 7.

The prohibiting unit 602 prohibits the transfer of the metadata of the preliminary download data on the basis of the number of information processing apparatuses 11 that are downloading (transmitting) the preliminary download data using the transmitter/receiver 601 (hereinafter, referred to as the number of downloading apparatuses). In the present embodiment, if the number of downloading apparatuses, i.e., the number of information processing apparatus 11 that are downloading the preliminary download data using the transmitter/receiver 601 is equal to or larger than a threshold, the prohibiting unit 602 prohibits the transfer of the metadata of the preliminary download data.

Figure 5:
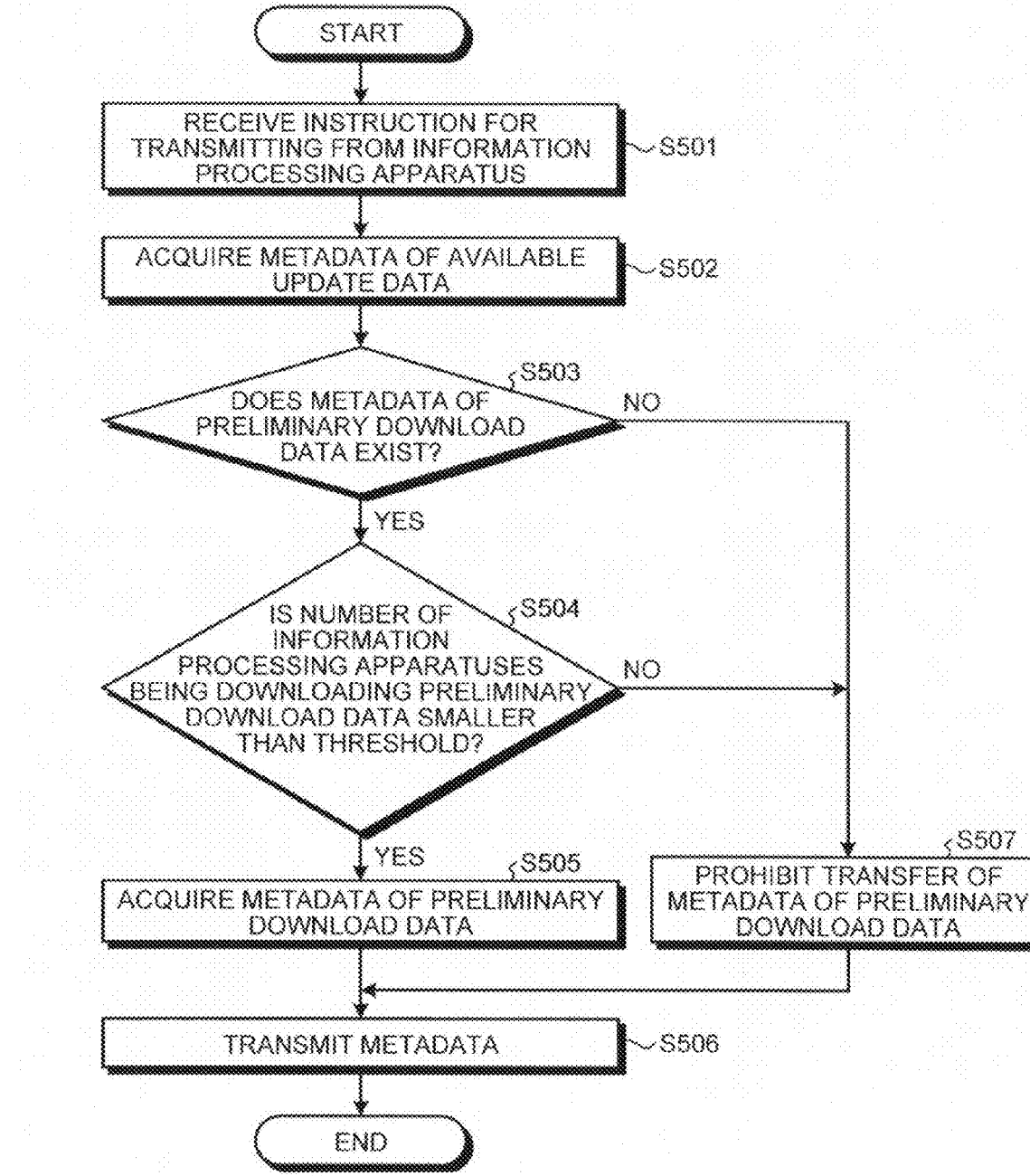
FIG. 5 is a flowchart illustrating a process flow for transmitting metadata in the update server according to the first embodiment.

The following describes a control method of the update server 60 when metadata is transmitted from the update server 60 according to the present embodiment. FIG. 5 is a flowchart illustrating a process flow for transmitting metadata in the update server according to the first embodiment.

The transmitter/receiver 601 receives, from the information processing apparatus 11, an instruction for transmitting that instructs transmission of the metadata of the update data (Step S501). In the present embodiment, the transmitter/receiver 601 functions as a receiver that receives the instruction for transmitting the metadata of the update data used for the update from the information processing apparatus 11 that executes the update. After receiving the instruction for transmitting the metadata of the update data, the transmitter/receiver 601 acquires metadata of available update data from the metadata of the update data stored in the storage unit 204 (Step S502). In the present embodiment, the transmitter/receiver 601 acquires, from the metadata of the update data stored in the storage unit 204, metadata having a "valid date" (refer to FIG. 7) earlier than the current date and time as the metadata of the available update data. The valid date indicates a predetermined update date and time, from which an update becomes available. Also in the present embodiment, the transmitter/receiver 601 acquires the current date and time from a clock included in a network time protocol (NTP) server or the update server 60, for example.

The transmitter/receiver 601 then determines whether the metadata of the preliminary download data exists in the metadata of the update data stored in the storage unit 204 (Step S503). In the present embodiment, the transmitter/receiver 601 acquires, from the metadata of the update data stored in the storage unit 204, metadata having a "valid date" (refer to FIG. 7) later than the current date and time (the current date and time acquired from a clock included in a network time protocol (NTP) server or the update server 60, for example) as the metadata of the preliminary download data. The valid date indicates the update date and time, from which an update becomes available. With this configuration, the transmitter/receiver 601 determines whether preliminary download data exists in the update data, which is included in the update related information stored in the update server 60. The preliminary download data indicates update data having an update date and time, from which an update becomes available, later than the current date and time.

If the metadata of the preliminary download data exists (Yes at Step S503), that is, it is determined that the preliminary download data exists, the prohibiting unit 602 then determines whether the number of downloading apparatuses, i.e., the number of information processing apparatuses 11 that are downloading the preliminary download data transmitted from the transmitter/receiver 601 is smaller than a threshold (Step S504). In the present embodiment, the prohibiting unit 602 determines whether the number of downloading apparatuses per unit time (e.g., per 10 minutes) is smaller than the threshold (e.g., 100 units). More specifically, the prohibiting unit 602 counts the number of accesses to the preliminary download data per unit time as the number of downloading apparatuses. The number of downloading apparatuses includes the number of information processing apparatuses 11 that have accessed the preliminary download data but have not yet started downloading the preliminary download data (i.e., the information processing apparatus 11 before downloading the preliminary download data), in addition to the number of information processing apparatuses 11 that are downloading the preliminary download data. The prohibiting unit 602 then determines whether the counted number of downloading apparatuses is smaller than the threshold.

If the number of information processing apparatuses 11 that are downloading the preliminary download data is smaller than the threshold (Yes at Step S504), the transmitter/receiver 601 acquires the metadata of the preliminary download data stored in the storage unit 204 (Step S505). The transmitter/receiver 601 subsequently transmits the metadata of the preliminary download data acquired at Step S505 together with the metadata acquired at Step S502 (the metadata of the available update data) to the information processing apparatus 11 that is the sender of the instruction for transmitting the metadata (Step S506). Although, in the present embodiment, the transmitter/receiver 601 transmits the preliminary download data together with the metadata of the available update data in the present embodiment, any configuration is allowable as long as at least the preliminary download data is transmitted. The metadata transmitted includes data that is used to determine whether an update using the preliminary download data is needed (the data which corresponds to, in the present embodiment, the data item "version" written in the metadata illustrated in FIG. 7).

If the number of information processing apparatuses 11 that are downloading the preliminary download data is equal to or larger than the threshold (No at Step S503), the prohibiting unit 602 prohibits transfer of the metadata of the preliminary download data (Step S507). In the present embodiment, if the number of information processing apparatuses 11 that are downloading the preliminary download data (e.g., 110 units) is equal to or larger than the threshold (e.g., 100 units), the prohibiting unit 602 prohibits acquisition of the metadata of the preliminary download data stored in the storage unit 204, thereby prohibiting transfer of the metadata of the preliminary download data. The transmitter/receiver 601 then transmits only the metadata acquired at Step S502 (the metadata of the available update data) to the information processing apparatus 11 that is the sender of the instruction for transmitting the metadata (Step S506).

As a result, if the counted number of downloading apparatuses reaches the threshold (i.e., if the communication network 2 and the update server 60 are loaded due to download of the update data including the preliminary download data), the metadata of the preliminary download data is not transmitted to the information processing apparatus 11, and the transfer (download) of the preliminary download data is not instructed by the user of the information processing apparatus 11 (in other words, many accesses are not made to download the preliminary download data at the same time before the update date and time). Therefore, it is possible to distribute the time when the communication network 2 and the update server 60 are loaded due to the downloading of the preliminary download data and thus it is possible to prevent an increase in the time that is taken to download the upload data including the preliminary download data, which means that a decrease in the user's convenience is prevented.

The following describes an update operation of the information processing apparatus 11 according to the first embodiment. FIG. 6 is a flowchart illustrating an operation flow for updating in the information processing apparatus according to the first embodiment.

The user interface unit 1102 turns on a power supply of the information processing apparatus according to an operation of a power switch or the like, of the operation unit 108 (Step S610) and displays a starting screen on the display 13 (Step S611). The starting screen is a display screen that displays a list of call statuses of all of the information processing apparatuses 11 that are obtained from the remote communication management server 50 under control of the CPU 101.

The update unit 1103 starts update confirmation when the power supply of the information processing apparatus is turned on (Step S612). The update confirmation is a process for determining whether the computer program 104 or the various setting information of the information processing apparatus is updated to the latest version. In the description below, it is determined whether the computer program 104 of the information processing apparatus is updated. Whether the various setting information is updated is also determined in the same manner.

When the update confirmation starts, the update unit 1103 transmits, via the transmitter/receiver 1101, to the update server 60 an instruction for transmitting metadata of the computer program of the latest version (Step S613). The update unit 1103 then acquires the metadata transmitted by the transmitter/receiver 601 of the update server 60 in response to the instruction for the transmission (Step S614).

The following describes the details of the metadata. FIG. 7 is a diagram illustrating an example of the metadata transmitted from the update server according to the first embodiment. As illustrated in FIG. 7, metadata of each version includes data items "version", "dependency", "description", "files", "scriptname", "require_reboot", "force_update", "valid date", and "data size".

The item "version" is data that is used to determine whether an update using the upload data (the preliminary download data) is needed. In the item "version", a version number of the upload data, such as "1.0.1", is written in the present embodiment. In the item "dependency", a version number indicating another version, such as "1.0.0", that has a mutual dependency relation, is written. Therefore, it is possible to detect a version that has a dependency relation by checking the version number written in the data item of the "dependency". In the item "description", the details of the version such as "It is sample data." is written. In the item "files", a list of upload data (data files) used for the update and stored in the update server 60 and storage places thereof or a checksum of the data files are written. Therefore, the update unit 1103 acquires the data files by the transmitter/receiver 1101, on the basis of the content written in the data item "files". As a result, the update unit 1103 can execute the update of the version written in the metadata. In the "script-name", a name of a script executed when an update is executed is written. In the "require_reboot", a flag ("true" or "false") indicating whether the device is to be rebooted after executing the update is written. In the "force_update", a flag ("true" or "false") indicating whether the update is a compulsory update is written. In the "valid date", the date and time, such as "201209151200", from which an update using the data files of the version written in the metadata becomes available, is written. In the "data size", the amount of data of the data files of the version written in the metadata is written.

The update of the computer program 104 includes the update associated with the control of the network I/F 111, the image-capturing element I/F 112, the voice input/output I/F 113, and the display I/F 114 (hereinafter, "device control"). In the update associated with the device control, the reboot is needed after the update. Therefore, "true" is written in the item "require_reboot". As described above, the update of the computer program 104 includes the normal update and the compulsory update. If the compulsory update is executed, "true" is written in the "force_update".

The update unit 1103 detects whether a different version having a dependency relation exists, on the basis of the content described in the data item "dependency" of the acquired metadata (Step S615). As illustrated in FIG. 7, if the version number indicating a different version, such as "1.0.0", is described in the data item "dependency", it is detected that a version having a dependency relation exists. If nothing is described in the data item "dependency", it is detected that no version having a dependency relation exists.

If the update unit 1103 detects that a different version having a dependency relation exists (Yes at Step S616), the update unit 1103 transmits, via the transmitter/receiver 1101, to the update server 60 an instruction for transmitting metadata of data files of the different version having a dependency relation (Step S617). The transmitter/receiver 1101 acquires the metadata of data files of the different version having a dependency relation transmitted by the update server 60 in response to the instruction for the transfer (Step S618). As described above, the update unit 1103 sequentially traces back to a different version having a dependency relation with the latest version and acquires metadata of the different version.

The update unit 1103 compares the version number written in the "version" in the metadata of the data files of the latest version having a date and time written in the "valid date" earlier than the current date and time with the version number of the computer program 104 stored in the storage unit 105, thereby determining whether the computer program 104 has already been updated (i.e., whether the computer program 104 needs to be updated by using the upload data) (Step S619). In the present embodiment, if the version number of the latest version is equal to the version number of the computer program 104, the update unit 1103 determines that the computer program 104 has already been updated because the version of the computer program 104 is the latest version. If the version number of the latest version is not equal to the version number of the computer program 104, the update unit 1103 determines that the computer program 104 has not been updated yet because the version of the computer program 104 is an old version.

If the update unit 1103 determines that the computer program 104 has not been updated yet (No at Step S619), that is, the update unit 1103 determines that the update is needed, the update unit 1103 notifies the user interface unit 1102 of update related information (hereinafter, "update information") (Step S620). In the present embodiment, the update unit 1103 notifies the user interface unit 1102 of the necessary data items, that is, the data items other than the data items unnecessary for the user, such as the "files" or the "scriptname", among the metadata of the data files of the latest version and the different version having a dependency relation with the latest version.

The user interface unit 1102 displays existence of the computer program 104 that needs to be updated on the starting screen of the display 13, on the basis of the update information notified by the update unit 1103, thereby notifying the user of the existence of the computer program 104 that needs to be updated (Step S621).

Figure 8:
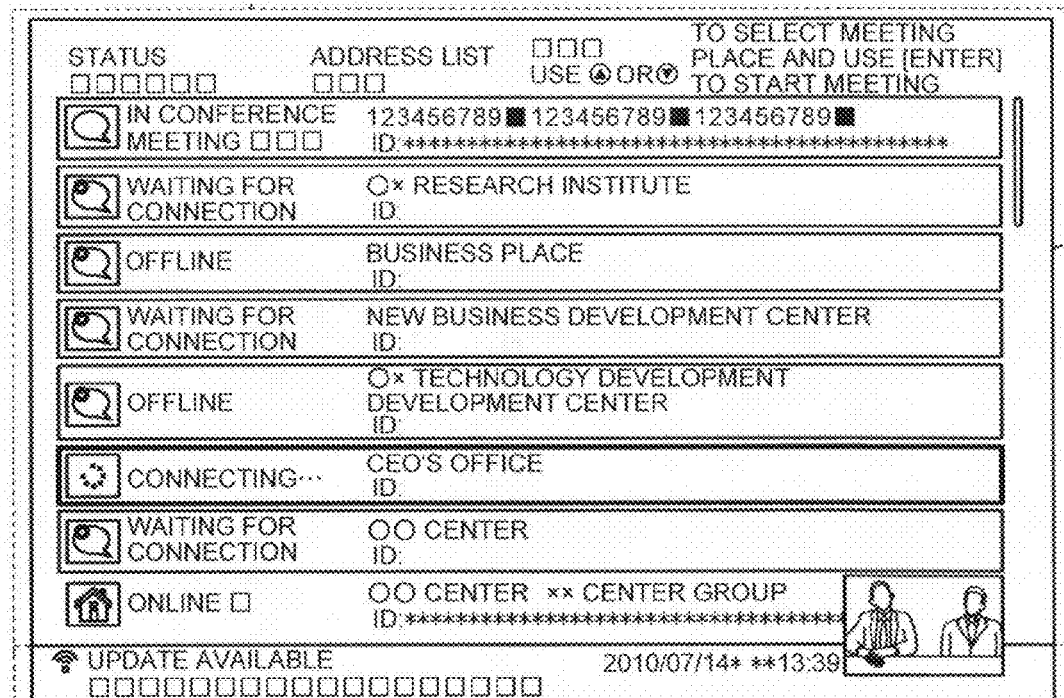
FIG. 8 is a diagram illustrating an example of a starting screen displayed on the information processing apparatus according to the first embodiment.

The following describes the details of the starting screen. FIG. 8 is a diagram illustrating an example of a starting screen G1 displayed on the information processing apparatus according to the first embodiment. As illustrated in FIG. 8, the starting screen G1 includes a main screen G11 that displays a list of call statuses of the other information processing apparatuses and a status screen G12 that displays a status of the own information processing apparatus. If the update information is notified by the update unit 1103, the user interface unit 1102 displays existence of the update on the status screen G12, thereby notifying the user of the existence of the update. The display of the existence of the update is not limited to the layout illustrated in the drawings and a predetermined icon image may be displayed on the main screen G11 to notify the user of the existence of the update. In the examples of the screens that are illustrated in the drawings (FIGS. 8 to 11, 13, 16, 17, and the like), the portions represented with white squares or black squares indicate areas where a message can be displayed, and are, for example, message display areas that are reserved on a system.

The user interface unit 1102 displays, if "true" is written in the "force_update" among the data items included as the update information, information indicating that the update existing on the information processing apparatus is the compulsory update on the starting screen G1 thereby notifying the user of the compulsory update. Specifically, the user interface unit 1102 may display the information indicative of the compulsory update on the status screen G12 or display a grayed-out list on the main screen G11 to notify the user that no operation is available other than update.

If an operation instruction for executing an update or making various settings is input through the operation unit 108, the user interface unit 1102 displays a setting screen on the display 13 (Step S622).

Figure 9:
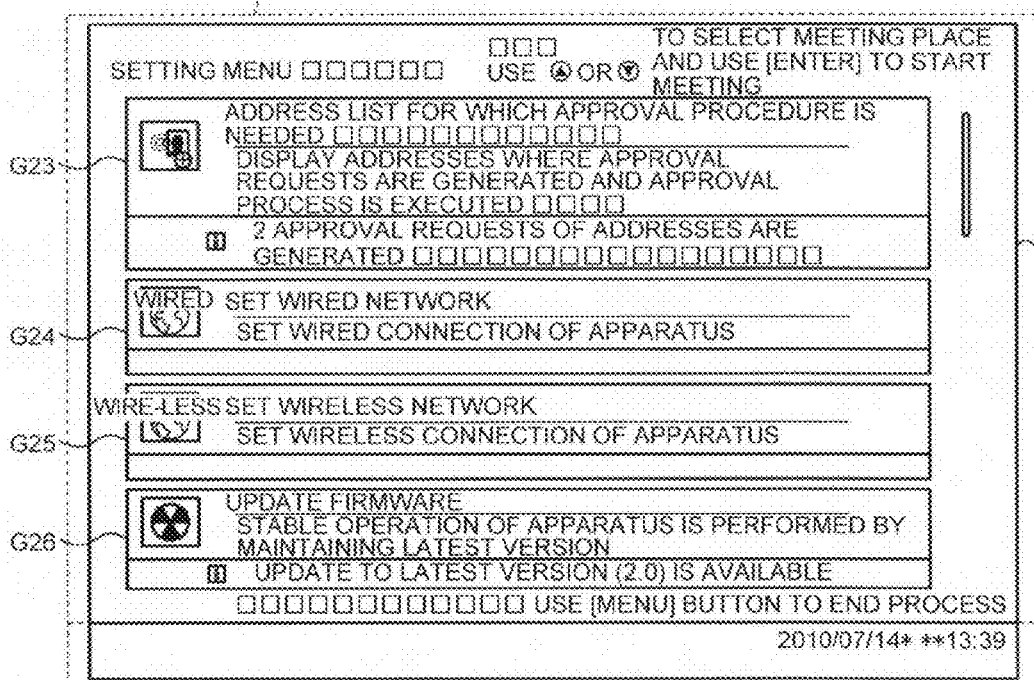
FIG. 9 is a diagram illustrating an example of a setting screen displayed on the information processing apparatus according to the first embodiment.

FIG. 9 is a diagram illustrating an example of the setting screen displayed on the information processing apparatus according to the first embodiment. As illustrated in FIG. 9, the setting screen G2 includes a main screen G21 that displays setting buttons G23 to G26 for instructing to execute an update and make various settings upon receiving the operation by the user through the user interface unit 1102. The setting button G26 among the setting buttons G23 to G26 is a button for instructing to execute an update.

If no update information is notified by the update unit 1103 and no program (firmware) to be updated exists, the user interface unit 1102 causes the setting button G26 disabled by, for example, causing the setting button G26 to be grayed out. By contrast, if update information is notified by the update unit 1103 and a program to be updated exists, the user interface unit 1102 causes the grayed-out setting button G26 back to the original form, thereby causing the setting button G26 enabled. In the setting button G26, a version number of the latest version to which the update is executed may be written, on the basis of the description of the data item "version" included as the update information. In the setting button G26 illustrated in FIG. 9, it is described that an update to the latest version having a version number of 2.0 is available. The user interface unit 1102 may display a status screen to display a status of the information processing apparatus on the setting screen G2.

If an operation on the setting button G26 is performed, the user interface unit 1102 displays a confirmation screen for confirming whether to execute the update on the display 13 (Step S623).

Figure 10:
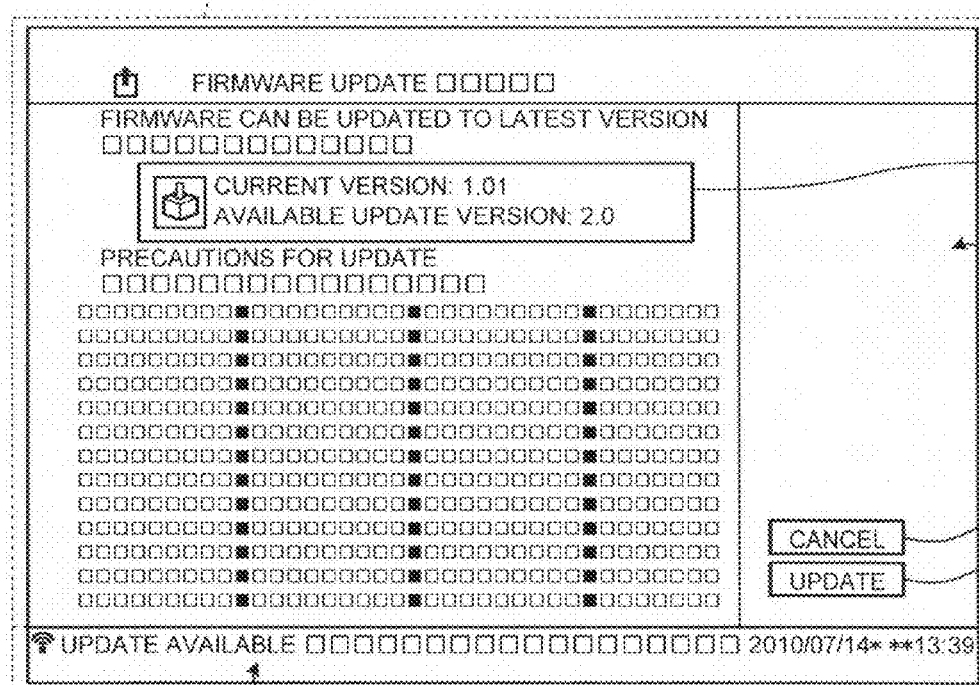
FIG. 10 is a diagram illustrating an example of a confirmation screen displayed on the information processing apparatus according to the first embodiment.

FIG. 10 is a diagram illustrating an example of the confirmation screen displayed on the information processing apparatus according to the first embodiment. As illustrated in FIG. 10, the confirmation screen G3 includes a main screen G31 and a status screen G32. The main screen G31 includes an update display G33 on which the content of an update to be executed is displayed and operation buttons G34 and G35 for receiving, from the user, an instruction to execute or cancel the update. On the status screen G32 is displayed a status of the information processing apparatus. On the update display G33 is displayed information that includes the current version number, which is the version number of the computer program 104 of the information processing apparatus, and the version number of the latest version to which the update is executed on the basis of the description of the data item "version" included in the update information. The user can confirm, based on the content displayed on the update display G33, the version number to which the update is executed. On the update display G33 of the confirmation screen G3, information as to whether the reboot is to be performed may be displayed.

Figure 11:
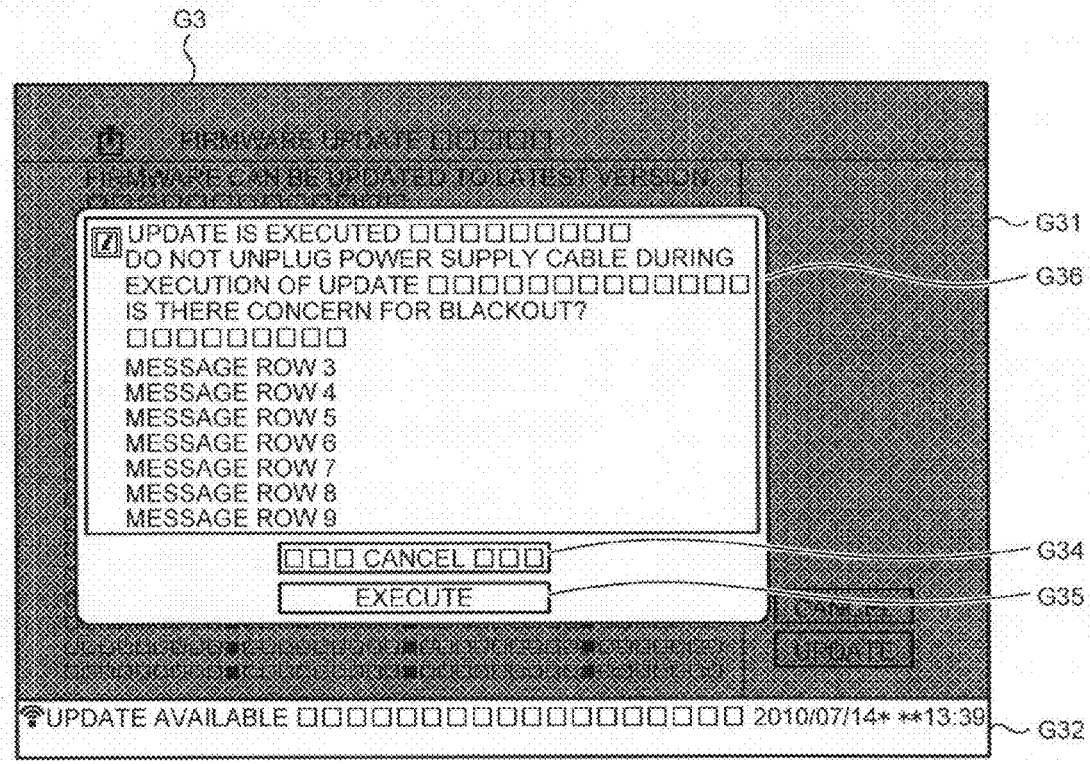
FIG. 11 is a diagram illustrating an example of a confirmation window displayed on the information processing apparatus according to the first embodiment.

FIG. 11 is a diagram illustrating an example of a confirmation window displayed on the information processing apparatus according to the first embodiment. In the present embodiment, if the operation button G35 is selected to instruct the execution of the update in the confirmation screen G3, the confirmation window G36 is displayed to prompt the user to confirm whether to execute the update. In the confirmation window G36, information on the version number of the latest version to which the update is executed and precautions for the update are displayed. The confirmation window G36 is displayed on the confirmation screen G3 when an instruction of the update is input in order to invite user's attentions. The user interface unit 1102 may display information as to whether the reboot is to be performed on the confirmation window G36.

With reference to FIG. 6 again, the update unit 1103 determines whether the update is to be executed on the basis of the operation on the operation buttons G34 and G35 in the confirmation screen G3 (Step S624). If the operation button G35 for instructing the execution of the update is selected (Yes at Step S624), the update unit 1103 executes an update process on the basis of the acquired metadata (Step S625).

If the operation button G34 for cancelling the execution of the update is selected, for example, and thus the operation button G35 is not selected (No at Step S624), the update unit 1103 determines whether the compulsory update is included in the update processes that have not been executed, on the basis of the described content in the item "force_update" included in the acquired metadata (Step S626). If the compulsory update is included (Yes at Step S626), the update unit 1103 executes an end process to end the process of the information processing apparatus (Step S627) and turns off the power supply of the information processing apparatus 11. If the compulsory update is not executed, even a call cannot be executed; therefore, the power supply of the information processing apparatus 11 is turned off to prevent the execution of an unnecessary operation. By contrast, if the compulsory update is not included (No at Step S626), the update unit 1103 does not execute the update at the current time; thus, execution of a usual operation is continued (Step S628). This enables the user to prioritize a call over an update.

That is, in the information processing apparatus 11, if the computer program 104 that needs to be updated exists, the user interface unit 1102 notifies the user of the existence of the update. The information processing apparatus 11 receives a selection operation as to whether the update is to be executed from the user through the user interface unit 1102. If the selection operation to execute the update is performed, the update unit 1103 executes the update process. Therefore, the user can selectively execute the update of the information processing apparatus 11 if the computer program 104 that needs to be updated exists.

At Step S619, if the version number written in the data item "version" in the metadata having a date and time written in the data item "valid date" earlier than the current date and time among the metadata of the data files of the latest version is equal to the version number of the computer program 104, whereby if it is determined that the computer program 104 has been updated to the latest version (Yes at Step S619), that is, the computer program 104 does not need to be updated, the update unit 1103 determines whether the preliminary download data exists on the basis of the data item "valid date" in the metadata of the data files of the latest version (Step S629). If the date and time written in the data item "valid date" in the metadata of the data files of the latest version is on or later than the current date and time, the update unit 1103 determines that the preliminary download data exists (Yes at Step S629), and executes the preliminary download process for downloading the preliminary download data (Step S630).

If the date and time written in the data item "valid date" in the metadata of the data files of the latest version is earlier than the current date and time, the update unit 1103 determines that no preliminary download data exists (No at Step S629) and continues the usual operation (Step S628).

Figure 12:
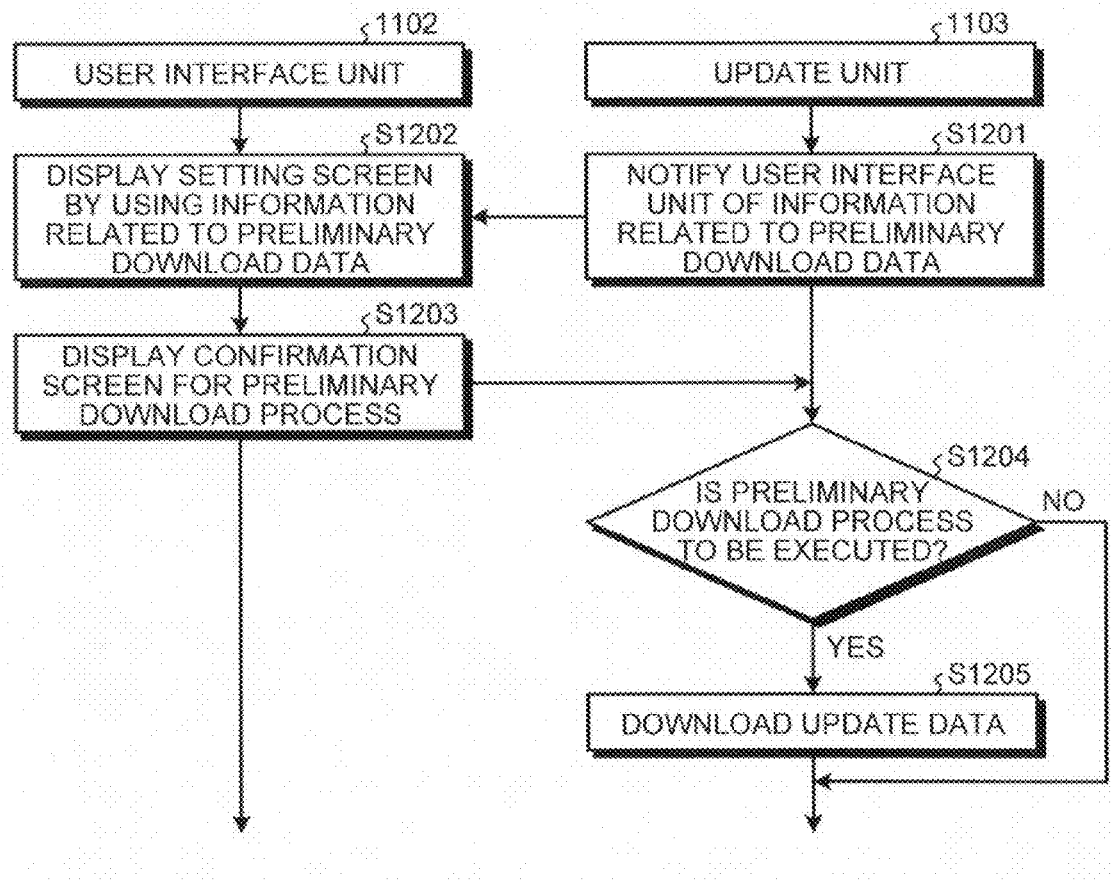
FIG. 12 is a flowchart illustrating a process flow for preliminarily downloading in the information processing apparatus according to the first embodiment.

The following describes the preliminary download process in detail with reference to FIG. 12. FIG. 12 is a flowchart illustrating a flow of the preliminary download process in the information processing apparatus according to the first embodiment.

If the update unit 1103 determines that the preliminary download data exists (Yes at Step S629), the update unit 1103 notifies the user interface unit 1102 of the necessary data items (i.e., the data items other than data items unnecessary to let the user know, such as "files" and "scriptname", among the metadata having a date and time written in the data item "valid date" on or later than the current date and time) as information related to the preliminary download data (Step S1201).

Figure 13:
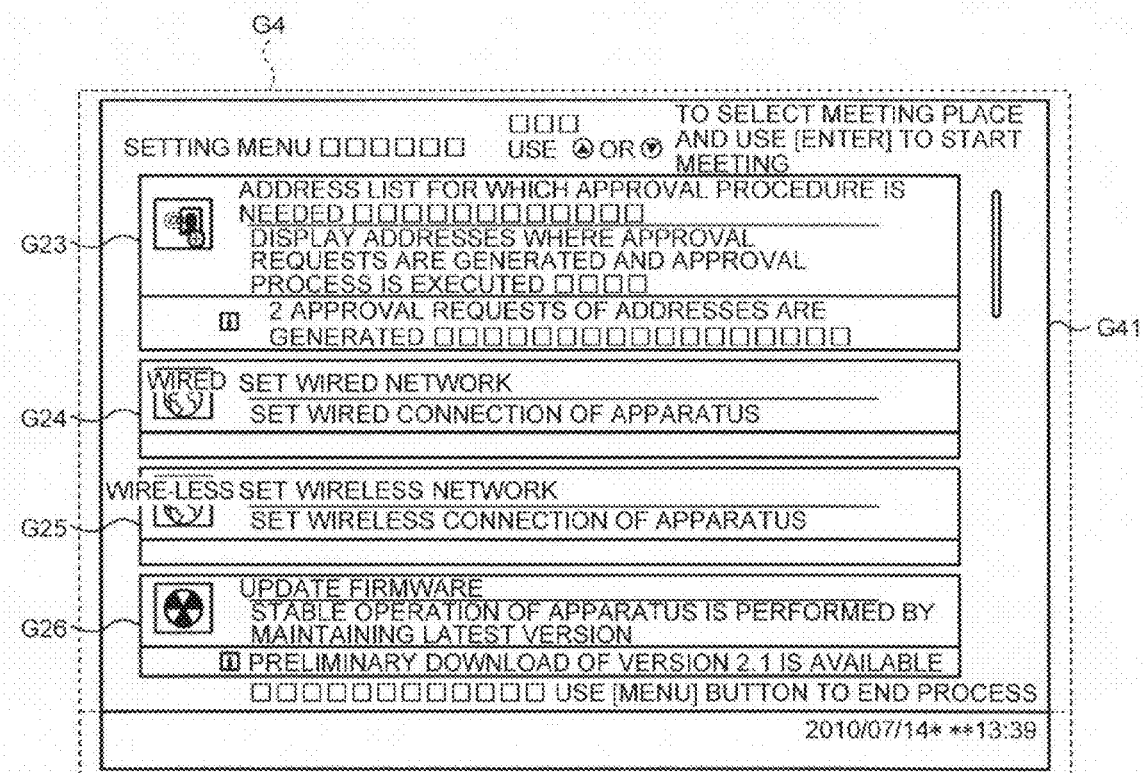
FIG. 13 is a diagram illustrating an example of a setting screen displayed on the information processing apparatus according to the first embodiment.

When information related to the preliminary download data is notified, the user interface unit 1102 displays the setting screen on the display 13 by using the information related to the preliminary download data (Step S1202). FIG. 13 is a diagram illustrating an example of the setting screen displayed on the information processing apparatus according to the first embodiment. As illustrated in FIG. 13, the setting screen G4 includes a main screen G41 displaying setting buttons G23 to G25 and G42 for instructing execution of the preliminary download process or making various settings in response to a user operation through the user interface unit 1102. The setting button G42 among the setting buttons G23 to G25 and G42 is the button for instructing execution of the preliminary download process. The setting button G42 may include the version number of the latest version to which the preliminary download process is executed, for example, on the basis of the description in the data item "version" included in information related to the preliminary download data. In the setting button G42 illustrated in FIG. 13, it is allowable to describe that the preliminary download process with the latest version having a version number of 2.1 is available.

Figure 14:
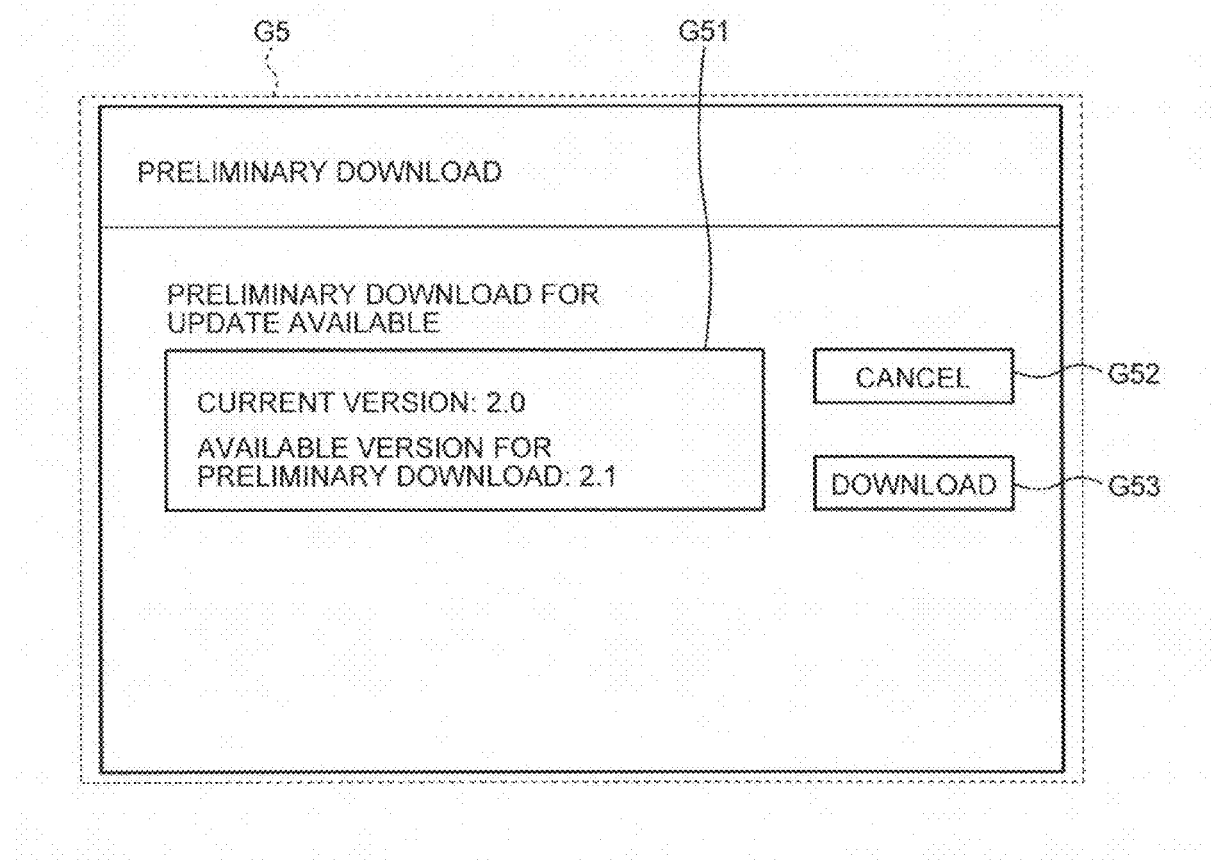
FIG. 14 is a diagram illustrating an example of a confirmation screen displayed on the information processing apparatus according to the first embodiment.

If the setting button G42 is selected, the user interface unit 1102 displays the confirmation screen for confirming whether to execute the preliminary download process on the display 13 (Step S1203). FIG. 14 is a diagram illustrating an example of the confirmation screen displayed on the information processing apparatus according to the first embodiment. As illustrated in FIG. 14, the confirmation screen G5 includes a preliminary download display G51 and operation buttons G52 and G53. The preliminary download display G51 is used to display the content of the preliminary download process to be executed. The operation buttons G52 and G53 are used to receive, from a user, an instruction to execute or cancel the preliminary download process as it is displayed. The preliminary download display G51 displays the version number of the latest version to which the preliminary download process is executed on the basis of the description of the data item "version" included in the information related to the preliminary download data, in addition to the current version that is the version number of the computer program 104 in the information processing apparatus. The content of the preliminary download display G51 enables the user to confirm which version number of the preliminary download data is to be downloaded.

The update unit 1103 determines whether the preliminary download process is to be executed, on the basis of the operation on the operation button G52 or G53 in the confirmation screen G5 (Step S1204). If the operation button G53 is selected for instructing execution of the preliminary download process (Yes at Step S1204), the update unit 1103 downloads the preliminary download data (the update data) on the basis of metadata having a date and time written in the data item "valid date" on or later than the current date and time (i.e., the metadata of the preliminary download data) among the acquired metadata (Step S1205).

Figure 15:
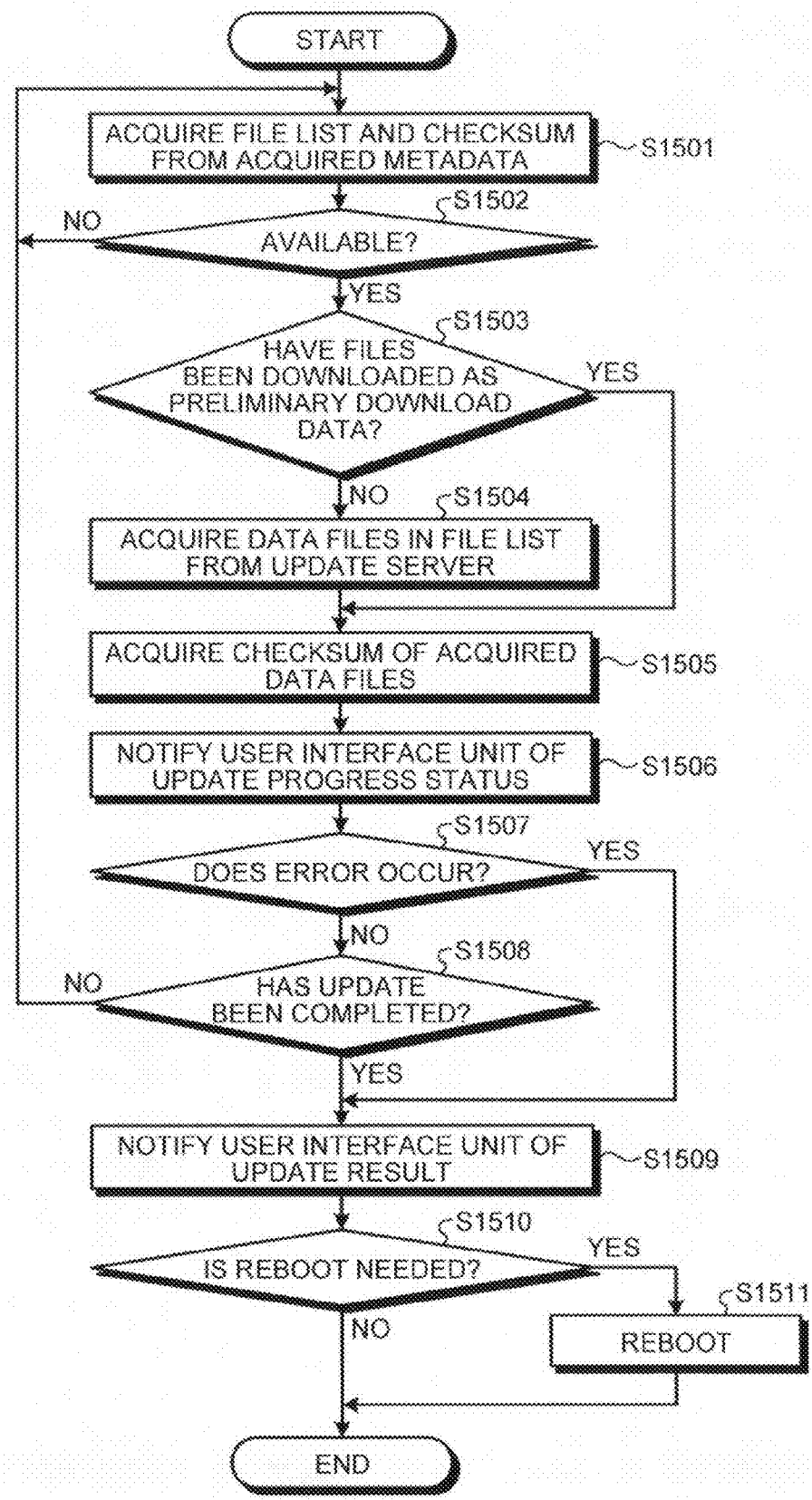
FIG. 15 is a flowchart illustrating a flow of an update process in the information processing apparatus according to the first embodiment.

The following describes the details of the update process (Step S625 illustrated in FIG. 6) with reference to FIG. 15. FIG. 15 is a flowchart illustrating a flow of an update process in the information processing apparatus according to the first embodiment.

If the update process starts, the update unit 1103 stops functions of the interface units, such as the image-capturing element I/F 112, the voice input/output I/F 113, and the like, that are used to connect to external devices, such as the camera 12, the microphone 14, and the speaker 15. When the interface units are in operation, the computer program 104 related to the interface units is being used. In such a situation, an update error may occur. In order to prevent the update error, the update unit 1103 stops the functions of the interface units when the update process starts.

The update unit 1103 then acquires a file list of data files (the update data) used for the update and a checksum of the files from the item "files" included in the acquired metadata (Step S1501). If the acquired metadata has two or more versions that have a dependency relation, the update unit 1103 executes processes from Step S1501 to S1508 for the versions sequentially in the chronological order of the version numbers.

Subsequently, the update unit 1103 determines whether an update using the data files (the update data) corresponding to the acquired metadata is available on the basis of the date and time from which the update becomes available, the date and time being described in the data item "valid date" in the acquired metadata (Step S1502). In the present embodiment, if, for example, the date and time written in the data item "valid date" in the acquired metadata is on or earlier than the current date and time obtained from a clock or the like included in the NTP server or the information processing apparatus, the update unit 1103 determines that the update using the data files (the update data) corresponding to the acquired metadata is available.

If the update unit 1103 determines that an update using the data files corresponding to the acquired metadata is available (Yes at Step S1502), the update unit 1103 determines whether the data files corresponding to the acquired metadata have been downloaded from the update server 60 through the preliminary download process, that is, the update unit 1103 determines whether the data files corresponding to the acquired metadata are the preliminary download data (Step S1503).

If it is determined that the data files corresponding to the acquired metadata have not been downloaded from the update server 60 through the preliminary download process (No at Step S1503), the update unit 1103 acquires the data files (the update data) in the file list obtained at Step S1501 from the update server 60 (Step S1504) and also acquires the checksum of the obtained data files (Step S1505). If it is determined that the data files corresponding to the acquired metadata have been downloaded from the update server 60 through the preliminary download process (Yes at Step S1503), the update unit 1103 acquires the downloaded data files (the preliminary download data) through the preliminary download process from the destination of the download (e.g., the storage unit 105) and acquires the checksum of the acquired data files. The update unit 1103 updates the computer program 104 stored in the storage unit 105 by using the acquired data files.

The update unit 1103 subsequently notifies the user interface unit 1102 of the progress status of the update (Step S1506). The progress status represents to what extent the files in the file list have been subjected to the process of Steps S1504 and S1505. When two or more versions have a dependency relation and update to the versions is executed, respectively, the progress status may represent to which version the update has been completed. The user interface unit 1102 displays the notified progress status of the update on a screen of the display 13 to notify the user of the progress status of the update.

Figure 16:
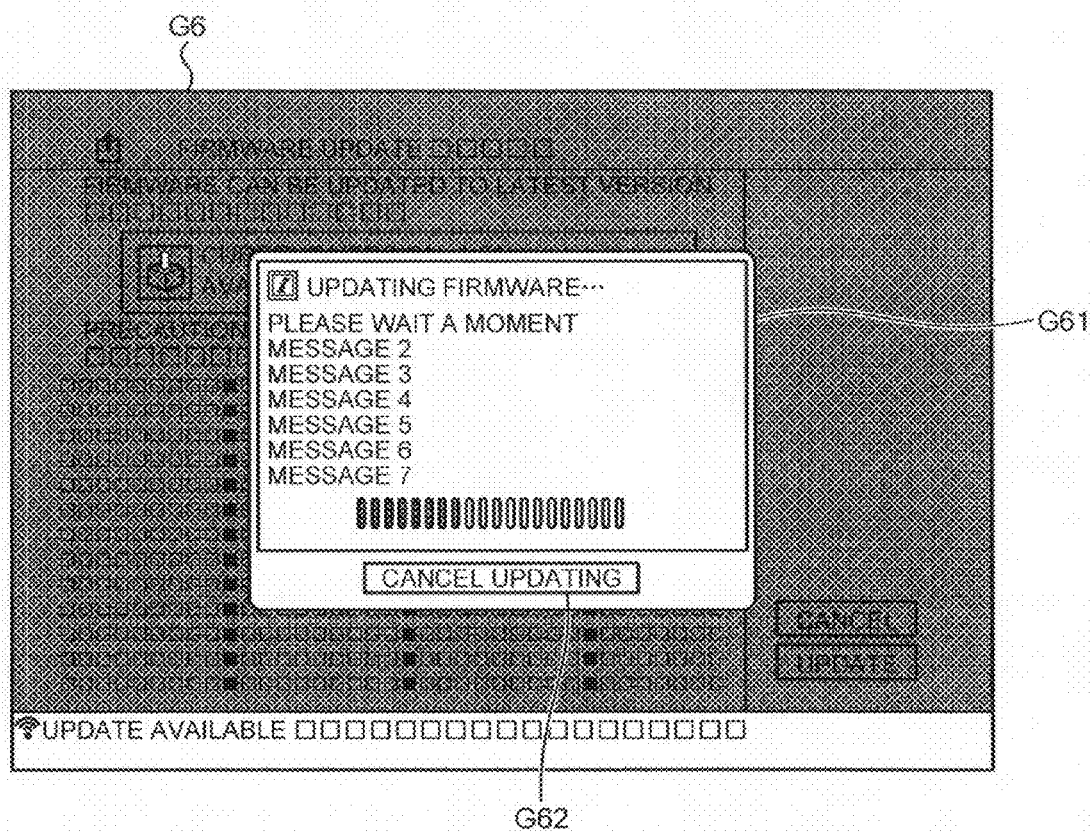
FIG. 16 is a diagram illustrating an example of an updating screen displayed on the information processing apparatus according to the first embodiment.

FIG. 16 is a diagram illustrating an example of an updating screen displayed on the information processing apparatus according to the first embodiment. As illustrated in FIG. 16, the update screen G6 is a screen displayed on the display 13 by the user interface unit 1102 during the update process performed by the update unit 1103. The update screen G6 displays an update status window G61 to display the progress status of the update notified by the update unit 1103 and an operation button G62 for instructing to cancel the update. The user can confirm the progress status of the update from the displayed content of the update status window G61.

In addition, the user interface unit 1102 may display remaining time to complete the update or a current line speed in real time on the update screen G6. In this case, the user can clearly grasp the details of the progress status of the update.

The update unit 1103 determines whether an error occurs during the update process (Step S1507). If an error occurs during the update process (Yes at Step S1507), the process sequence proceeds to Step S1509. In the present embodiment, errors determined by the update unit 1103 determines include an error caused by any factor during the execution of the update process (e.g., the difference between the checksum acquired at Step S1505 and the checksum acquired at Step S1501), cancellation of the update through an operation on the operation button G62 in the update screen G6, and necessity of reboot by the version resulted from the update executed at steps S1504 and S1505. Therefore, if the updates are executed sequentially in the chronological order of the version numbers, the processes from steps S1501 to S1508 are skipped when the update of the version that needs to reboot the information processing apparatus 11 is executed.

If no error occurs during the update process (No at Step S1507), the update unit 1103 determines whether the update has been completed for all of the versions related to the acquired metadata (Step S1508). When the update has not been completed for all of the versions (No at Step S1508), the process returns to Step S1501 and the update process continues. When the update has been completed for all of the versions (Yes at Step S1508), the process sequence proceeds to Step S1509.

The update unit 1103 notifies the user interface unit 1102 of the result of the update (Step S1509). The user interface unit 1102 displays the notified result of the update on the screen of the display 13, thereby notifying the user of the result of the update.

Figure 17:
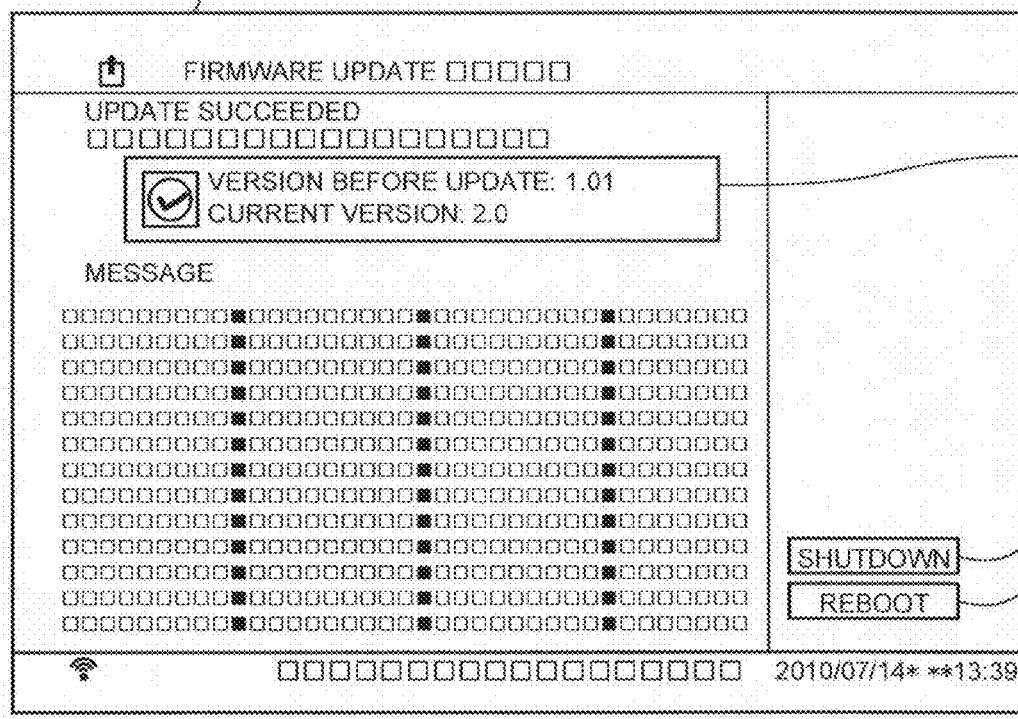
FIG. 17 is a diagram illustrating an example of a confirmation screen displayed on the information processing apparatus according to the first embodiment.

FIG. 17 is a diagram illustrating an example of a confirmation screen displayed on the information processing apparatus according to the first embodiment. Upon receiving the result of the update, the user interface unit 1102 displays on the confirmation screen G7, as illustrated in FIG. 17, the result of the update G71 and the operation buttons G72 and G73 for receiving an operation for a shutdown or a reboot after the update. The result of the update G71 displays information related to the version before the update and information related to a current version after the update. This content of the result of the update G71 enables the user to confirm the result of the update.

The update unit 1103 then determines whether the information processing apparatus 11 needs to be rebooted, on the basis of the description in the "require_reboot" included in the metadata of the update data used for the update (Step S1510). If the information processing apparatus 11 does not need to be rebooted (No at Step S1510), the update unit 1103 ends the update process without performing the reboot (Step S109). If the information processing apparatus 11 needs to be rebooted (Yes at Step S1510), the update unit 1103 reboots the information processing apparatus 11 (Step S1511). As such, if an update requiring a reboot is executed, the reboot is automatically executed after the update, without a reboot operation by the user.

As described above, with the update server 60 according to the present embodiment, it is possible to prevent access concentration to the preliminary download data, which is update data that is allowed to be downloaded before a predetermined update date and time, from occurring before the update date and time. Therefore, it is possible to distribute the time when the communication network 2 and the update server 60 are loaded due to the downloading of the preliminary download data. Furthermore, it is possible to prevent, for example, an increase in the time takes to download the upload data including the preliminary download data and, thus, it is possible to prevent degradation of the user' convenience.

Second Embodiment

In the present embodiment, an example is described in which if a call to another information processing apparatus (e.g., a teleconference) is started while executing the preliminary download process, the preliminary download process is stopped. The following describes the different points from the first embodiment.

FIG. 18 is a block diagram illustrating the functional configuration of an information processing apparatus 1800 and an update server 60 according to a second embodiment. The information processing apparatus 1800 according to the second embodiment includes a transmitter/receiver 1101, a user interface unit 1102, an update unit 1103, and an application status monitoring unit 1801. The update server 60 includes a transmitter/receiver 601 and a prohibiting unit 602.

The application status monitoring unit 1801 monitors the execution status of an application executed on the information processing apparatus 1800. If an application for communicating (calling) with another information processing apparatus is started among the applications to be executed on the information processing apparatus 1800 while executing the preliminary download process (Step S630 illustrated in FIG. 6) by the update unit 1103, the application status monitoring unit 1801 stops the preliminary download process executed by the update unit 1103.

The following describes in detail an operation for stopping the preliminary download process executed on the information processing apparatus 1800 according to the present embodiment. FIG. 19 is a flowchart illustrating a process flow for stopping the preliminary download process in the information processing apparatuses according to the second embodiment.

If the update unit 1103 starts the preliminary download process (Step S1901), the application status monitoring unit 1801 monitors the communication status of another information processing apparatus (e.g., a call in a teleconference). If a communication with another information processing apparatus starts, the application status monitoring unit 1801 notifies the update unit 1103 of the start of the communication with another information processing apparatus (Step S1902) to stop the preliminary download process executed by the update unit 1103 (Step S1903).

After that, if the communication with another information processing apparatus ends, the application status monitoring unit 1801 notifies the update unit 1103 of the end of the communication with another information processing apparatus (Step S1904) and resumes the preliminary download process executed by the update unit 1103 (Step S1905).

As described above, the information processing apparatus 1800 according to the present embodiment is connected to an external device (an information processing apparatus installed in a different region) via the communication network 2 and it is capable of communicating with the external device. When the information processing apparatus 1800 acquires, from the update server 60 connected via the communication network 2, the preliminary download data, i.e., update data having an update date and time, from which the update becomes available, on or later than the current date and time, among the update data used for the update, and, furthermore, the information processing apparatus 1800 starts a communication with the external device while being acquiring the preliminary download data, the information processing apparatus 1800 stops acquiring the preliminary download data. With this configuration, during when communication data, such as voices and images, are exchanged between the information processing apparatuses 1800 installed in different regions, the network bandwidth of the communication network 2 is not consumed for downloading the preliminary download data and, thus, the communication quality between the information processing apparatuses 1800 is not affected.

The computer program executed by the update server 60 and the information processing apparatus 11 according to the first embodiment or the information processing apparatus 1800 according to the second embodiment are provided in a manner recorded as an installable or executable file format on a computer-readable recording medium, such as a compact disk read-only memory (CD-ROM), a flexible disk (FD), a compact disk recordable (CD-R), and a digital versatile disk (DVD).

In addition, the computer program executed by the update server 60 and the information processing apparatus 11 according to the first embodiment or the information processing apparatus 1800 according to the second embodiment may also be provided in a manner stored in a computer connected to a network such as the Internet so as to be downloaded through the network. The computer program executed by the update server 60 and the information processing apparatus 11 according to the first embodiment or the information processing apparatus 1800 according to the second embodiment may also be provided or distributed over a network such as the Internet.

The embodiments have been presented by way of example only, and are not intended to limit the scope of the invention. For another example, the update server 60 may include a receiving function that receives an instruction for transmitting the metadata of the update data used for the update from the information processing apparatus 11 that executes the update; a determining function that determines whether the preliminary download data exists in the update data; a transmitting function that transmits the metadata of the preliminary download data; and a prohibiting function that prohibits the transfer of the metadata of the preliminary download data. Alternatively, a server other than the update server 60 or the information processing apparatus 11 included in the remote communication system 1 may include the receiving function, the determining function, the transmitting function, and the prohibiting function. A plurality of servers may be included in the update server 60, and any server among such servers may include the receiving function, the determining function, the transmitting function, and the prohibiting function. In addition, the system configuration including the information processing apparatus 11, the remote communication management server 50, and the update server 60 connected to each other described in the embodiments has been presented by way of example only, and it is understood that various system configurations may be presented in response to various uses and purposes.

The present invention has an effect of distributing the time when a network and a server are loaded due to downloading preliminary download data; and preventing an increase in the time taken to download update data including the preliminary download data and, thus, preventing degradation of the user's convenience.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A server comprising:
processor circuitry that
receives from an information processing apparatus that executes update, an instruction for transmitting metadata of update data used for the update, the metadata including at least a first version that is the latest, a second version that is different from the first version, the first and second versions having a mutual dependency relation, and a flag indicating whether the update is compulsory or not, wherein the information processing apparatus determines that the update is compulsory based on the flag and powers off the information processing apparatus when the information processing apparatus further determines that the execution of the update is cancelled,
sequentially traces back to a different version having a dependency relation with the latest version and acquires metadata of the different version,
determines whether the update data includes preliminary download data, wherein
the preliminary download data has an update date and time later than a current date and time, and
the update date and time is a date and time from which the update becomes available,
transmits, when the processor circuitry determines that the update data includes preliminary download data, only metadata of the preliminary download data to the information processing apparatus via a communication network prior to downloading the update data, and
prohibits, when the processor circuitry determines that the update data includes the preliminary download data and a number of information processing apparatuses that are downloading the preliminary download data is more than a predetermined value, transfer of the metadata of the preliminary download data.

2. The server according to claim 1, wherein if the number of the information processing apparatuses that are downloading the preliminary download data per unit time is equal to or larger than a threshold, the processor circuitry prohibits transfer of the metadata of the preliminary download data.

3. The server according to claim 1, wherein the processor circuitry transmits the metadata of the preliminary download data together with metadata of update data having an update date and time that has been passed.

4. An information processing system comprising:
an information processing apparatus that executes update; and
a server that is connected to the information processing apparatus via a network, wherein the server includes:
processor circuitry that
receives, from the information processing apparatus, an instruction for transmitting metadata of update data used for the update, the metadata including at least a first version that is the latest, a second version that is different from the first version, the first and second versions having a mutual dependency relation, and a flag indicating whether the update is compulsory or not, wherein the information processing apparatus determines that the update is compulsory based on the flag and powers off the information processing apparatus when the information processing apparatus further determines that the execution of the update is cancelled;
sequentially traces back to a different version having a dependency relation with the latest version and acquires metadata of the different version;
determines, whether the update data includes preliminary download data, wherein
the preliminary download data has an update date and time later than a current date and time, and
the update date and time is a date and time from which the update becomes available;
transmits, when the processor circuitry determines that the update data includes preliminary download data, only metadata of the preliminary download data to the information processing apparatus via a communication network prior to downloading the update data; and
prohibits, when the processor circuitry determines that the update data includes the preliminary download data and a number of information processing apparatuses that are downloading the preliminary download data is more than a predetermined value, transfer of the metadata of the preliminary download data.

5. An information processing system comprising:
processor circuitry that executes a computer program that causes the processor circuitry to:
receive, from an information processing apparatus that executes update, an instruction for transmitting metadata of update data used for the update, the metadata including at least a first version that is the latest, a second version that is different from the first version, the first and second versions having a mutual dependency relation, and a flag indicating whether the update is compulsory or not, wherein the information processing apparatus determines that the update is compulsory based on the flag and powers off the information processing apparatus when the information processing apparatus further determines that the execution of the update is cancelled;
sequentially trace back to a different version having a dependency relation with the latest version and acquire metadata of the different version;
determine whether the update data includes preliminary download data, wherein
the preliminary download data has an update date and time later than a current date and time, and
the update date and time is a date and time from which the update becomes available;
transmit, when the processor circuitry determines that the update data includes preliminary download data, only metadata of the preliminary download data to the information processing apparatus via a communication network prior to downloading the update data; and
prohibit, when the processor circuitry determines that the update data includes the preliminary download data and a number of information processing apparatuses that are downloading the preliminary download data is more than a predetermined value, transfer of the metadata of the preliminary download data.

6. The information processing system according to claim 5, wherein
the information processing apparatus communicates with an external device that is connected to the information processing apparatus via the communication network, and
if a communication with an external device starts when the information processing apparatus is downloading the preliminary download data, the information processing apparatus stops downloading the preliminary download data.

7. A non-transitory computer readable medium storing a computer program thereon that, when executed by processor circuitry, causes the processor circuitry to perform:

receiving, from an information processing apparatus that executes update, an instruction for transmitting metadata of update data used for the update, the metadata including at least a first version that is the latest, a second version that is different from the first version, the first and second versions having a mutual dependency relation, and a flag indicating whether the update is compulsory or not, wherein the information processing apparatus determines that the update is compulsory based on the flag and powers off the information processing apparatus when the information processing apparatus further determines that the execution of the update is cancelled;

sequentially tracing back to a different version having a dependency relation with the latest version and acquiring metadata of the different version;

determining whether the update data includes preliminary download data, wherein the preliminary download data has an update date and time later than a current date and time, and the update date and time is a date and time from which the update becomes available;

transmitting, when the processor circuitry determines that the update data includes preliminary download data, only metadata of the preliminary download data to the information processing apparatus via a communication network prior to downloading the update data; and prohibiting, when the processor circuitry determines that the update data includes the preliminary download data and a number of information processing apparatuses that are downloading the preliminary download data is more than a predetermined value, transfer of the metadata of the preliminary download data.

* * * * *